United States Patent
Jitsukawa

(10) Patent No.: US 6,392,839 B2
(45) Date of Patent: *May 21, 2002

(54) DOOR STRUCTURE OF A RECORDING AND/OR REPRODUCING APPARATUS

(75) Inventor: Keiji Jitsukawa, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,983

(22) Filed: Mar. 12, 1999

(30) Foreign Application Priority Data

Mar. 18, 1998 (JP) ............................................ 10-069112

(51) Int. Cl.$^7$ .............................................. G11B 17/04
(52) U.S. Cl. ................................................... 360/99.06
(58) Field of Search .......................... 360/99.06, 99.02, 360/99.03, 99.07, 96.6; 369/77.1, 77.2, 291

(56) References Cited

U.S. PATENT DOCUMENTS

| | | | | |
|---|---|---|---|---|
| 3,815,150 A | * | 6/1974 | Stoddard et al. | 346/137 |
| 5,481,420 A | * | 1/1996 | Cadona et al. | 360/99.06 |
| 5,701,216 A | * | 12/1997 | Yamamoto et al. | 360/99.02 |
| 5,717,542 A | * | 2/1998 | Yokota et al. | 360/99.06 |
| 5,787,063 A | * | 7/1998 | Kanno et al. | 369/77.2 |
| 5,815,479 A | * | 9/1998 | Lee | 369/77.2 |

FOREIGN PATENT DOCUMENTS

JP 5-189947 * 7/1993

* cited by examiner

Primary Examiner—William Klimowicz
Assistant Examiner—Tianjie Chen
(74) Attorney, Agent, or Firm—Oblon, Spivak, McClelland, Maier & Neustadt, P.C.

(57) ABSTRACT

A recording/reproducing apparatus including a door member having its upper edge abutted against a lower edge of a forward stationary plate. The lower end of the stationary plate and the upper edge of the door member are formed with inclined surfaces that are inclined relative to the direction of insertion and detachment of a recording medium. When the recording medium is inserted, the door member is rotated by having its inclined surface thrust by the forward edge of the recording medium so as to be separated from the forward stationary plate to open the front side of the cartridge holder holding the recording medium to prevent intrusion of dust and dirt into the inside of the apparatus.

9 Claims, 16 Drawing Sheets

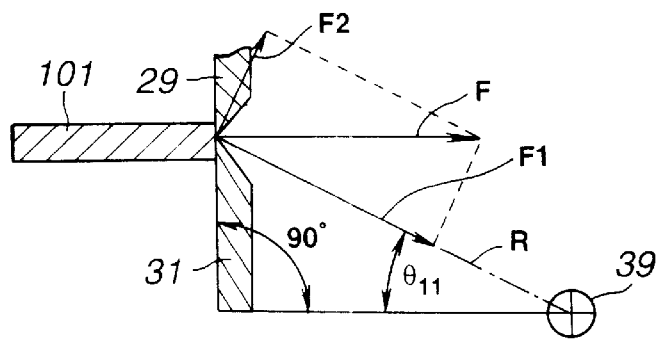
FIG.23
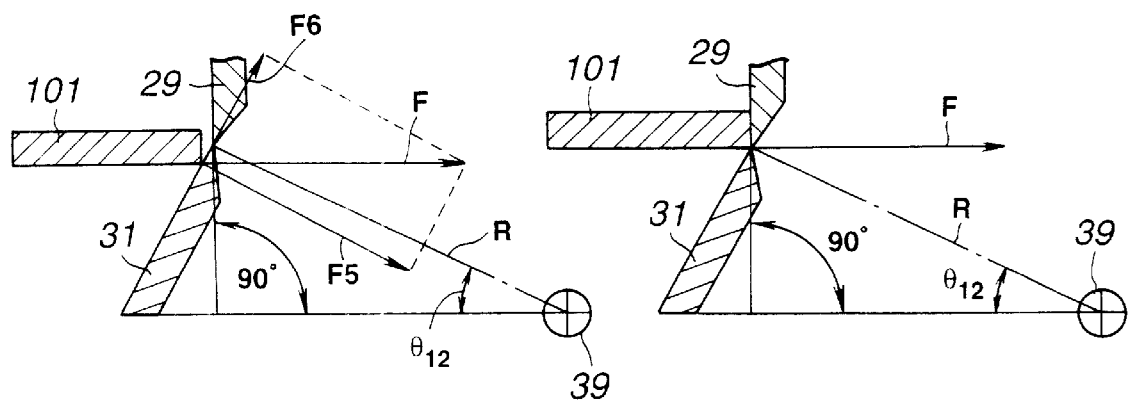
FIG.24A  FIG.24B
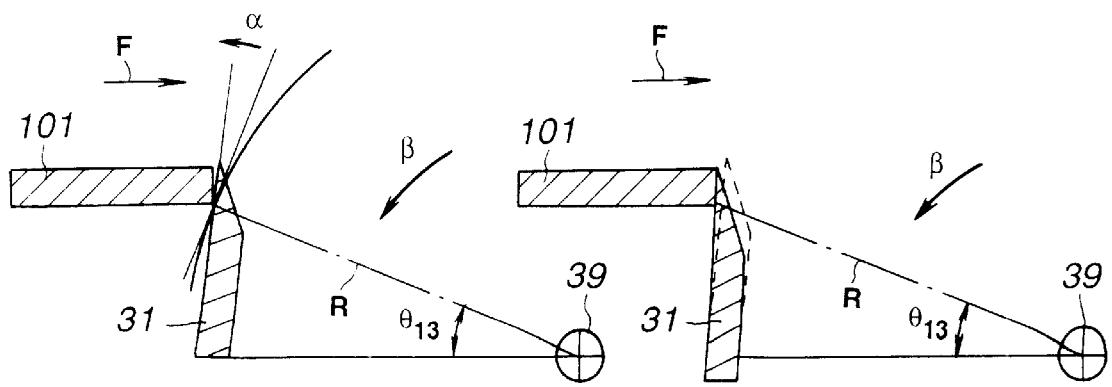
FIG.25A  FIG.25B

DOOR STRUCTURE OF A RECORDING AND/OR REPRODUCING APPARATUS

BACKGROUND OF THE INVENTION

1. Field of the Invention

This invention relates to a recording/reproducing apparatus for recording and/or reproducing information signals for a recording medium cartridge such as a magnetic disc cartridge.

2. Description of the Related Art

Up to now, a flat-plate-shaped recording medium, such as a so-called floppy disc, has been proposed. This floppy disc is constituted by a thin disc substrate coated with a recording layer, such as a magnetic layer. The floppy disc is rotatably housed in a thin casing-like cartridge having a flat-plate-shaped appearance, and is used as it is housed in the cartridge. There is also proposed a recording/reproducing apparatus for recording and reproducing information signals using this recording medium.

In this recording/reproducing apparatus, the recording medium is inserted into the apparatus with its major surface in a horizontal state via an elongated slit formed in the front side of the apparatus. The recording medium is loaded on a recording/reproducing unit in the recording/reproducing apparatus.

The floppy disc is held in the recording/reproducing apparatus by having its center hub portion held by a disc table constituting a recording/reproducing unit. This disc table, holding a floppy disc, is rotated by a spindle motor along with the floppy disc. For the floppy disc, run in rotation in this manner, information signals are recorded and/or reproduced by a magnetic head device.

The slit, via which a recording medium is inserted into the inside of a recording/reproducing apparatus, is closed by an openable lid plate, in the normal state in which it is not passed through by a recording medium, in order to prevent intrusion of dust and dirt into the inside of the apparatus. This lid plate has its upper edge portion rotatably mounted on an upper side portion of the slit in an outer casing of a recording medium via a pivot. When a recording medium is inserted into the slit from outside, this lid plate is thrust by a forward end of the recording medium looking along the direction of movement of the latter so as to be rotated towards the inside of the recording medium to open the slit.

If the recording medium is loaded on a recording/reproducing unit, the slit is kept opened, with the lower edge of the door resting on the upper surface of the recording medium. When the recording medium is disengaged from the recording/reproducing unit and ejected out of the recording/reproducing apparatus, the slit is kept opened, and the recording medium, having its upper surface kept in sliding contact with the lower edge of the lid plate, is ejected via the slit. When the recording medium is completely ejected, the slit of the lid plate is closed.

In the above-described recording/reproducing apparatus, it is desired to use a recording medium having a higher information recording density and hence a larger recording capacity. In a recording/reproducing apparatus, employing a recording medium having a high recording density, it is necessary to reliably prevent intrusion of dust and dirt into the apparatus more since a higher information recording density in a recording medium leads to an increased adverse effect of dust and dirt on the correct recording/reproduction of information signals.

In this consideration, a lid plate which allows a slit for insertion of a recording medium to be kept opened on loading thereof cannot be the one to be optimum in preventing intrusion of dust and dirt into the apparatus. It is therefore contemplated to use a lid plate which causes a slit for insertion of the recording medium to be closed.

However, the lid plate, thrust by a recording medium being inserted into the recording/reproducing apparatus and thereby opened towards the inside of the apparatus at the time of insertion of the recording medium into the apparatus, cannot be closed by movement of the recording medium when the recording medium is ejected from the inside towards the outside of the apparatus.

It may be contemplated to use a lid plate which is rotated towards the outside of the recording/reproducing apparatus with ejection of the recording medium. However, in this case, since the lid plate needs to be rotatable both towards the inside and towards the outside of the recording/reproducing apparatus, the lid plate needs to be smaller in size than the slit. In this case, the lid plate cannot sufficiently close the slit, so that intrusion of dust and dirt into the apparatus cannot be prevented sufficiently.

It may also be contemplated to provide a mechanism for opening the lid plate with ejection of the recording medium. However, in such case, the recording/reproducing apparatus is bulky and complex in structure.

SUMMARY OF THE INVENTION

It is therefore an object of the present invention to provide a recording/reproducing apparatus whereby intrusion of dust and dirt into the inside of the apparatus can be prohibited reliably to permit the recording medium of high information recording density to be used without increasing the size or the complexity in structure of the apparatus.

For overcoming the above problem, a recording/reproducing apparatus according to the present invention includes a cartridge holder into which is inserted a recording medium cartridge in a direction along the major surface of the recording medium cartridge, and door member positioned in its initial state on the path of movement of the recording medium cartridge adapted to be inserted into the cartridge holder, the door member presenting an inclined surface inclined relative to the direction of movement of the recording medium cartridge on the path of movement, the door member being supported for rotation up to a position outside the path of movement of the recording medium. The recording/reproducing apparatus also includes a closure member on which abuts one end edge of the door member and means for biasing the door member towards the closure member.

In the recording/reproducing apparatus according to the present invention, the door member has its inclined surface thrust by the forward edge along the direction of movement of the disc cartridge, when the recording medium cartridge is inserted into the cartridge holder or the recording medium cartridge is ejected from the cartridge holder, so that the door member is rotated against the bias of the biasing means to cooperate at its end edge with a closure member to clamp both major surfaces of the recording medium cartridge to guide the recording medium cartridge.

This door member reliably closes the path of movement of the recording medium cartridge to prevent intrusion of dust and dirt into the apparatus except during the time the recording medium cartridge is inserted into or ejected from the cartridge holder. Of course, the door member also positively closes the path of movement during the time the recording medium is loaded in position in the recording/reproducing apparatus.

Thus, the recording/reproducing apparatus according to the present invention is configured to prevent intrusion of dust and dirt into the apparatus to provide the recording medium cartridge having a high recording density for information signals without complicating the structure or increasing the size of the apparatus.

BRIEF DESCRIPTION OF THE DRAWINGS

FIG. 23 is a schematic view showing a case in which a first inclined surface of the door and an upper inclined surface of the front panel are at a right angle to the disc cartridge inserting direction.

FIGS. 24A and 24B are schematic views showing a case in which the first inclined surface of the door and the upper inclined surface of the front panel are at a right angle to the disc cartridge inserting direction and in which the first inclined surface of the door is at an angle relative to the inserting direction of the disc cartridge.

FIGS. 25A and 25B are schematic views showing a case in which the first inclined surface of the door is inclined relative to a tangential line to a turning circle traversing the point of abutment with the disc cartridge.

DESCRIPTION OF THE PREFERRED EMBODIMENTS

Figure 1:
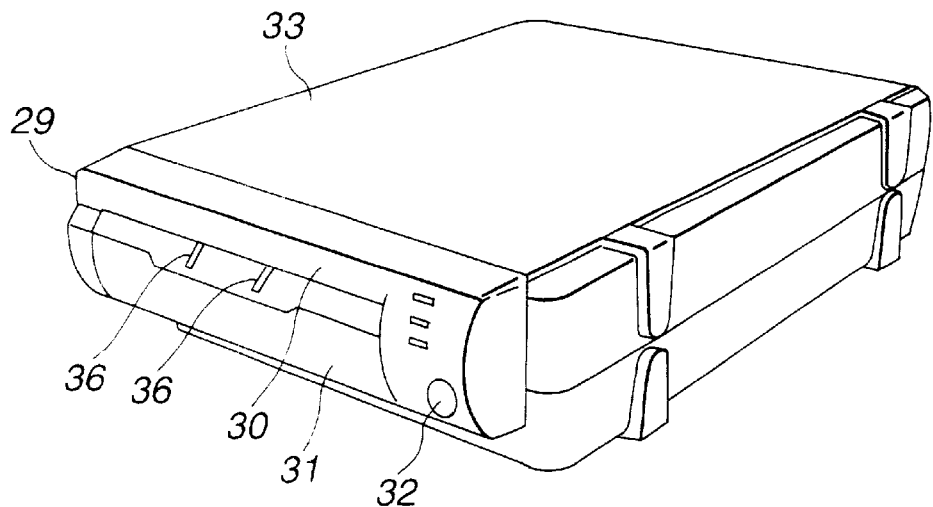
FIG. 1 is a perspective view showing the appearance of a recording/reproducing apparatus embodying the present invention.

Referring to the drawings, a preferred embodiment of the present invention will be explained in detail.

In the present embodiment, the recording/reproducing apparatus of the present invention is constructed as an apparatus employing a disc cartridge comprised of a recording disc housed in a thin-casing-like cartridge as a recording medium cartridge.

The recording disc is comprised of a disc-shaped disc substrate, formed of a thin-film-like synthetic resin material, and a layer of a magnetic material deposited on each major surface of the disc substrate. In this recording disc, the layer of the magnetic material is a recording layer for information signals. The recording disc is rotationally accommodated in the thin casing-shaped cartridge to constitute a disc cartridge. The signal recording area of the recording disc faces the outer side of the cartridge via a recording/reproducing aperture provided in the major surface of the cartridge. The recording/reproducing aperture can be opened or closed by a shutter slidably mounted on the cartridge. This shutter is formed by a thin metal sheet or a plate of a synthetic resin.

Centrally of the magnetic disc is mounted a disc-shaped hub formed of a magnetic material, such as iron. The hub has a center opening and faces the outside of the cartridge via a circular opening formed in the bottom surface of the cartridge. This recording/reproducing apparatus includes an outer casing 33, as shown in FIG. 1. The front side of the outer casing 33 is closed by a front panel 29. An upper side portion of the front surface of the outer casing 33 is secured to the outer casing 33 to constitute a closure member 30. On the lateral side of the front panel 29 is mounted an ejection button 32.

The lower side portion of the front panel 29 is an opening portion closed by a door member 31 having its upper edge portion abutted against the lower edge portion of the closure member 30. This door member 31 is movable downwards, as will be explained subsequently, so that, when the door member 31 is moved downwards, there is defined a gap between the upper edge portion thereof and the lower edge portion of the closure member 30.

Figure 2:
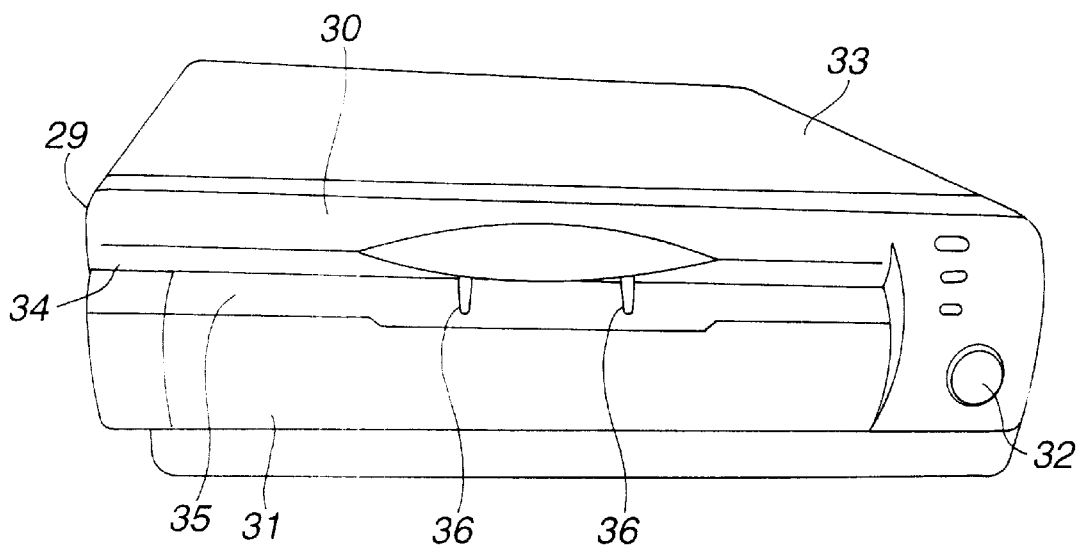
FIG. 2 is a perspective view showing the appearance of a front side of the recording/reproducing apparatus.

The door member 31 has an upper edge portion of the front surface thereof inclined towards the rear side to form a first inclined surface 35 inclined towards the rear side, as shown in FIG. 2. The first inclined surface 35 is formed with a pair of guide ribs 36, 36 adapted for having a sliding contact with the bottom surface of the disc cartridge to guide the disc cartridge when the disc cartridge is inserted into the inside of the recording/reproducing apparatus as will be explained subsequently. The lower side portion of the closure member 30 is formed as an upper inclined surface 34 inclined towards the rear. This upper inclined surface 34 serves for guiding the front side edge along the direction of movement of the disc cartridge on the first inclined surface 35 of the door member 31 when the disc cartridge is inserted from the front side of the recording/reproducing apparatus.

Figure 3:
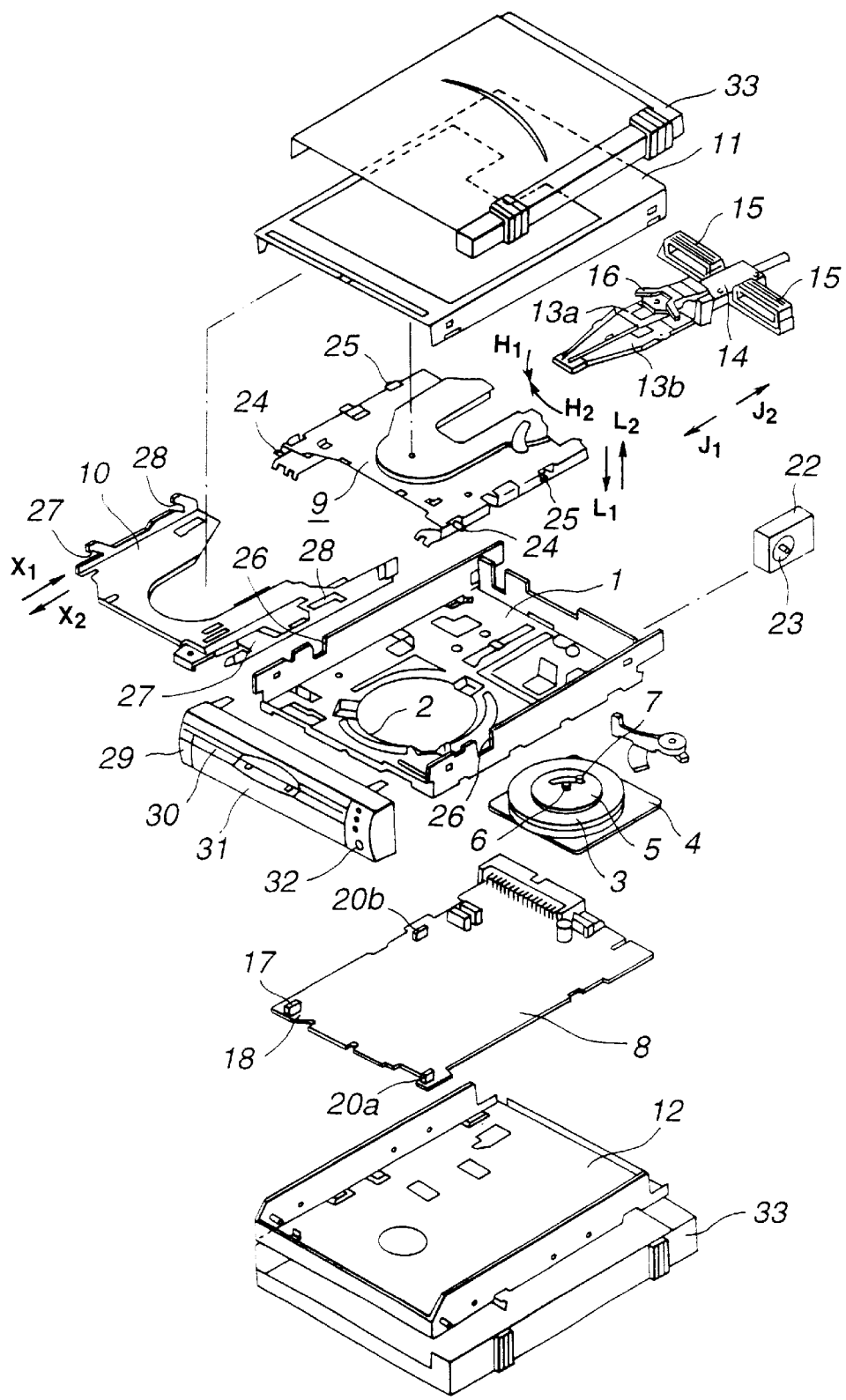
FIG. 3 is an exploded perspective view showing the structure of essential portions of the recording/reproducing apparatus.
Figure 4:
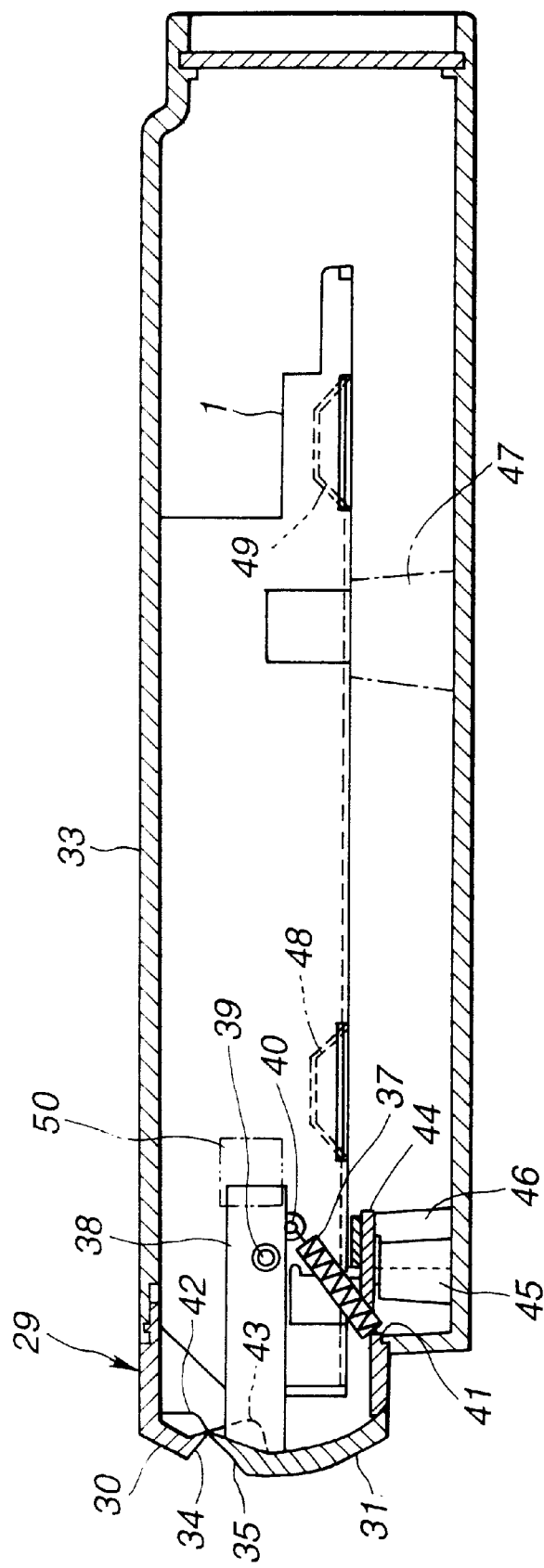
FIG. 4 is a longitudinal cross-sectional view showing the structure of the recording/reproducing apparatus.

The recording/reproducing apparatus includes a substantially flat-plate-shaped chassis 1 in the outer casing 33, as shown in FIG. 3. This chassis 1 is arranged on supporting members 45, 47 provided on the bottom surface within the outer casing 33, as shown in FIG. 4. The chassis 1 has a supporting piece 44 on its bottom surface and has the supporting piece 44 set on the supporting member 45 secured to the supporting member 45 via a stationary member 46 mounted on the supporting member 45. This stationary member 46 is a U-shaped member and is secured to the supporting member 45 as being fitted thereon.

Figure 5:
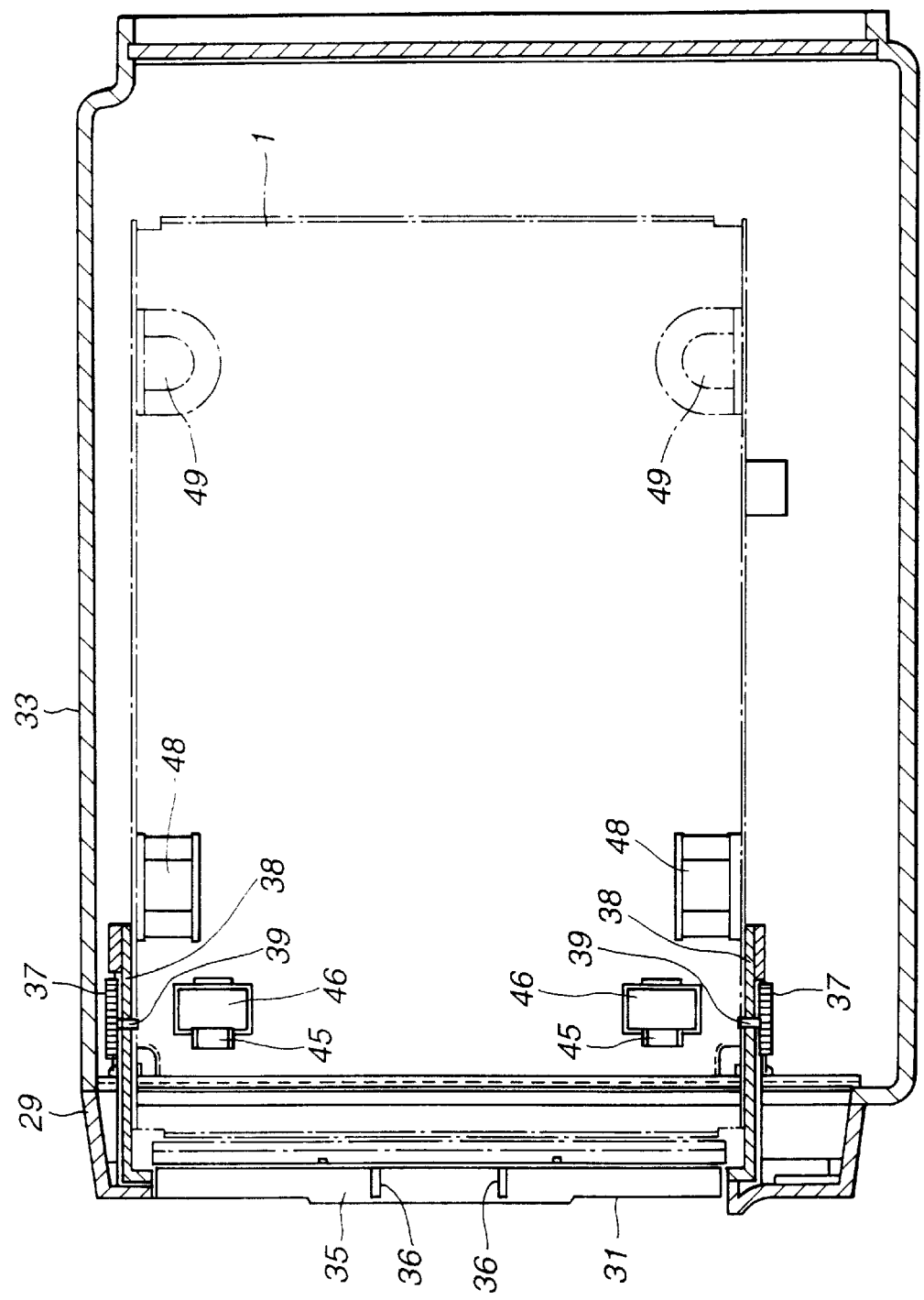
FIG. 5 is a transverse cross-sectional view showing the structure of the recording/reproducing apparatus.

On the chassis 1, there are provided paired positioning projections 48, 49, 48, 49 for positioning a cartridge holder when the cartridge holder as later explained completes the loading of the disc cartridge. This chassis 1 is arranged to occupy the major portion of the outer casing 33, as shown in FIGS. 4 and 5.

On this chassis 1 is arranged a spindle motor 3 fitted in a motor-mounting aperture 2 provided at a mid portion of the chassis 1 to face the upper surface of the chassis 1 to constitute a recording/reproducing unit, as shown in FIG. 3. This spindle motor 3 is used to run the recording disc in rotation, and is arranged on a stator substrate 4. On a spindle shaft 6 of the spindle motor 3 is mounted a substantially disc-shaped disc table 5 on which is mounted the hub of the recording disc. The spindle shaft 6 has its distal end protruded on the upper major surface of the center portion of the disc table 5. When the hub of the recording disc is loaded on the disc table 5, the spindle shaft 6 is fitted into the center opening of the hub.

On the upper major surface of the disc table 5 is arranged a chuck pin 7 which is set upright on the distal end of a spring plate, not shown, having its proxinal end rotatably mounted relative to the disc table 5 via a pivot. That is, this chuck pin 7 is movable relative to the disc table 5, in an axial direction of the spindle shaft 6, by the flexure and displacement of the spring plate, while being movable relative to the disc table 5 in a direction towards and away from the spindle shaft 6 by the rotation of the spring plate about the pivot. On the upper major surface of the disc table 5 is arranged a magnet, not shown, for attracting the hub. This magnet is a so-called rubber magnet of a substantially toroidal configuration.

On the lower surface of the chassis 1 is mounted an electronic circuit substrate 8 carrying variety of electronic circuits and detection switches as will be explained subsequently. Below the chassis 1 is mounted a lower cover 12 for overlying the lower surface of the electronic circuit substrate 8. On the upper side of the chassis 1 is mounted an upper cover 11 for overlying the upper surface of the chassis 1.

On the upper side of the chassis 1, between the chassis 1 and the upper cover 11, there is arranged a cartridge holder 9 for holding the disc cartridge for loading a recording disc in the disc cartridge on the disc table 5. That is, the cartridge holder 9 houses and holds the disc cartridge inserted from the front side of the recording/reproducing apparatus in a horizontal direction along its major surface and is moved downwards to load the disc cartridge held therein on the disc table 5. The cartridge holder 9 is formed as a thin casing opened in the front and lower sides and is adapted to accommodate therein the disc cartridge inserted therein from the front side.

On the chassis 1 are arranged a cam plate 10 for uplifting and lowering the cartridge holder 9 and a motor 22 operating as driving power generating means for moving the cam plate 10 in the fore-and-aft direction. The cam plate 10 is arranged between the cartridge holder 9 and the chassis 1 and has a pair of sidewall sections each having a forward side cam groove 27 and a rear side cam groove 28. In these cam grooves 27, 28 are engaged paired forward and rear side profiling pins 24, 25 protruded on both lateral sides of the cartridge holder 9. The rear side profiling pins 25, 25 of the cartridge holder 9 are fitted into guide grooves 26, 26 formed in the vertical direction in both lateral sides of the chassis 1.

Figure 13:
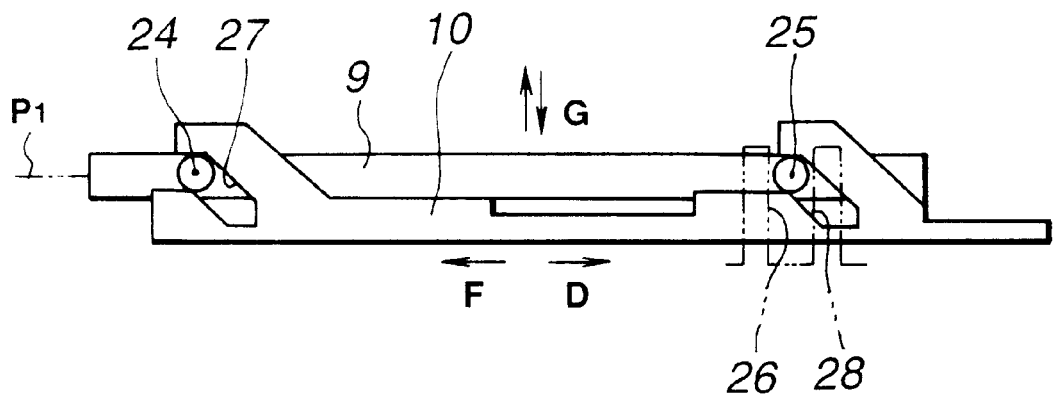
FIG. 13 is a schematic side view showing the structure of a cartridge holder lifting mechanism in the recording/reproducing apparatus.
Figure 14:
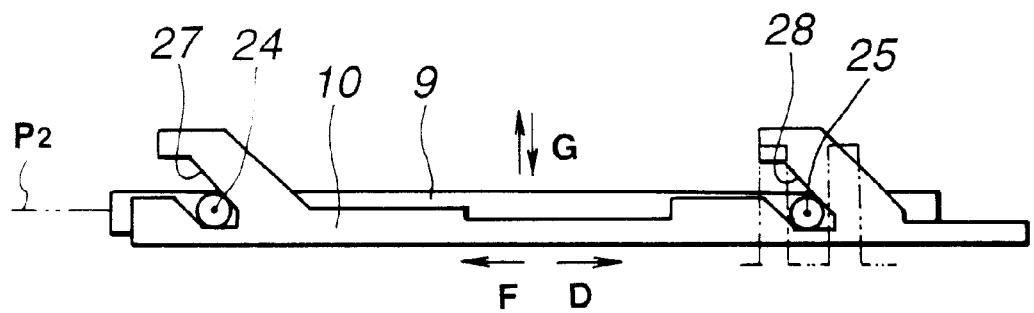
FIG. 14 is a side view showing the cartridge holder in the lowered state in the cartridge holder lifting mechanism.

That is, when the cam plate 10 is moved in the fore-and-aft direction as indicated by arrows X1 and X2 in FIG. 3, with the cam plate 10 being positioned towards the rear side of the chassis 1, the cartridge holder 9 is at an upper position in which the recording disc of the disc cartridge is displaced upwards from the disc table 5, as shown in FIG. 13. When the cam plate 10 is slid towards the front side of the chassis 1, the cartridge holder 9 is lowered in the direction indicated by arrows L1 and L2 in FIG. 3, as shown in FIG. 14, to a lower position in which the recording disc of the disc cartridge held therein is loaded on the disc table 5. The cam plate 10 is elastically biased by a biasing member, not shown, in the forward direction indicated by arrow F in FIGS. 13 and 14, by a biasing member, not shown.

Figure 8:
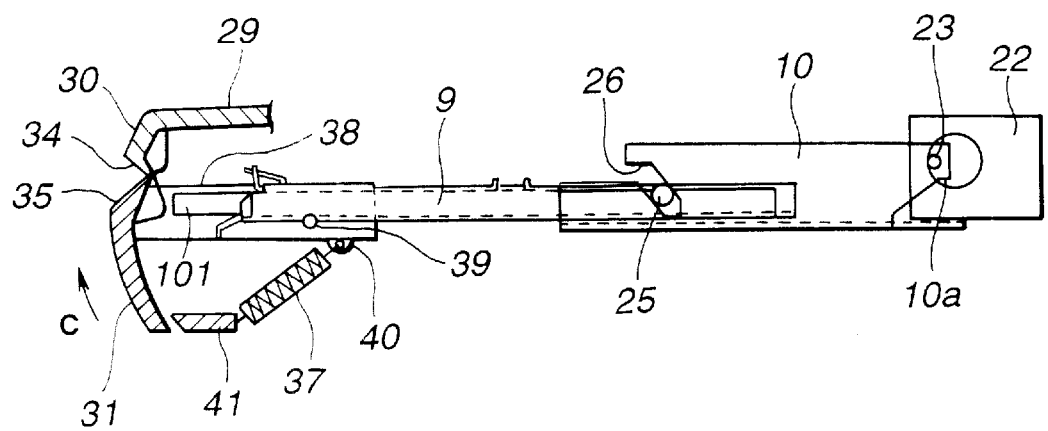
FIG. 8 is a schematic longitudinal cross-sectional view showing a disc cartridge which has just been inserted into the inside of the recording/reproducing apparatus.

The motor 22 has a driving pin 23, as shown in FIGS. 3 and 8. This driving pin is mounted on a driving shaft, not shown, at an offset position with respect to the driving shaft of the motor 22, and is moved on a annular trajectory under the driving by the motor 22. On the rear side of the cam plate 10 is mounted a driven piece 10a provided rearwardly of and engaged with the driving pin 23, as shown in FIG. 8. When the driving pin 23 is positioned forwards, the driving pin 23 is spaced apart from the driven piece 10a, as shown in FIG. 8. At this time, the cam plate 10 is at the most forward position, under the bias of a biasing member, with the cartridge holder 9 being at a lower position. When the driving pin 23 is at the rearward position, as shown in FIG.

Figure 9:
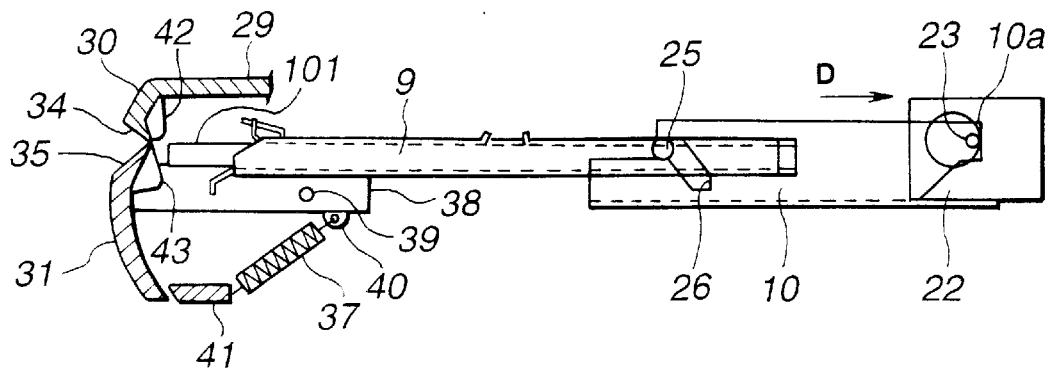
FIG. 9 is a schematic longitudinal cross-sectional view showing a disc cartridge prior to being ejected from the recording/reproducing apparatus.

9, the driving pin 23 thrusts the driven piece 10*a* towards rear, as indicated by arrow D in FIG. 9. At this time, the cam plate 10 is at the most rearward position, against the bias of the biasing member, to set the cartridge holder 9 to its upper side position.

On the front end side of the chassis 1 is mounted a front panel 29 attached to the outer casing 33 as described above. An ejection button 32 provided on the front panel 29 is an electrical switch adapted for driving the motor 22. When thrust from the forward side, the ejection button 32 causes a control circuit, not shown, to drive the motor 22.

On the rearward side of the chassis 1 are mounted paired arms, that is an upper head arm 13*a* and a lower head arm 13*b*, making up a recording/reproducing unit, as shown in FIG. 3. The rearward portion of the cartridge holder 9 is formed with a cutout in register with the head arms 13*a*, 13*b*. The distal ends of the head arms 13*a*, 13*b* carry paired magnetic heads, that is an upper magnetic head and a lower magnetic head, facing each other. These head arms 13*a*, 13*b* are elastically biased in a direction in which the distal ends thereof approach to each other as indicated by arrows H1 and H2 in FIG. 3. That is, the magnetic heads are biased in a direction approaching to each other. These head arms 13*a*, 13*b* are movable by a driving coil 15 in the fore-and-aft direction, which is the direction towards and away from each other as indicated by arrows J1 and J2 in FIG. 3. When the cartridge holder 9 is at the upper position, a holder engaging arm 16, protuberantly mounted on both lateral sides closer to the proximal end than the mid portion of the upper head arm 13*a*, is set on the upper surface on both lateral sides of the rear side cut-out of the cartridge holder 9, whereby the upper head arm 13*a* is uplifted and lowered in keeping with the uplifting and lowering of the cartridge holder 9.

When the disc cartridge is loaded in position on the recording/reproducing apparatus, the disc cartridge is inserted via the front side of the apparatus and via the opening provided in the lower portion of the front panel 29. The disc cartridge is housed and held in the cartridge holder 9.

Figure 6:
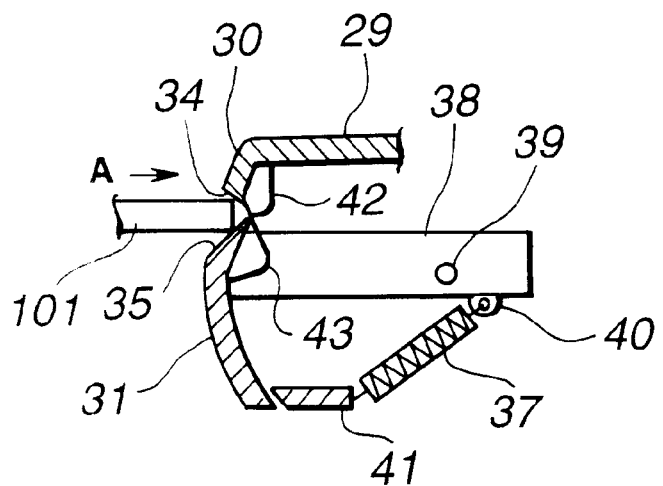
FIG. 6 is a schematic longitudinal cross-sectional view showing a disc cartridge about to be inserted into the inside of the recording/reproducing apparatus.

In the front panel 29, shown in FIG. 6, the door member 31 in the initial state is positioned on the path of movement of the disc cartridge 101 inserted into the cartridge holder 9. The first inclined surface 35, inclined relative to the movement direction of the disc cartridge 101 being inserted into the cartridge holder 9, is positioned in the path of movement of the disc cartridge 101 and faces the outside of the apparatus. The door member 31 has paired left and right rotation supporting arms 38, 38, as shown in FIG. 5. These right rotation supporting arms 38, 38 are extended towards the inside of the outer casing 33. These rotation supporting arms 38, 38 are rotatably mounted on the chassis 1 via the pivot 39, as shown in FIG. 6. When in an initial position, the door member 31 has its upper end abutted against the lower edge of the closure member 30, as shown in FIG. 6. That is, in this initial position, the opening of the front panel 29 is opened. The door member 31 is rotated about the pivot 39 to a position outside the path of movement of the disc cartridge 101, as shown in FIG. 7.

The door member 31 is rotationally biased towards the closure member 30, by a pair of tension coil springs 37, operating as biasing means, and is kept in its initial position by having its upper end abutted against the lower edge of the closure member 30. These tension coil springs 37 are retained at one ends by a spring retainer 41 on the lower end of the front panel 29, while having their opposite ends retained by another spring retainer 40 provided at the rear end of the rotation supporting arm 38. This rotation supporting arm 38, in which the spring retainer 40 is provided more rearwardly than the pivot 39, is rotationally biased by the tension coil springs 37 in a direction in which the rear end is directed downwards and in which the door member 31 is directed upwards towards the closure member 30.

Figure 7:
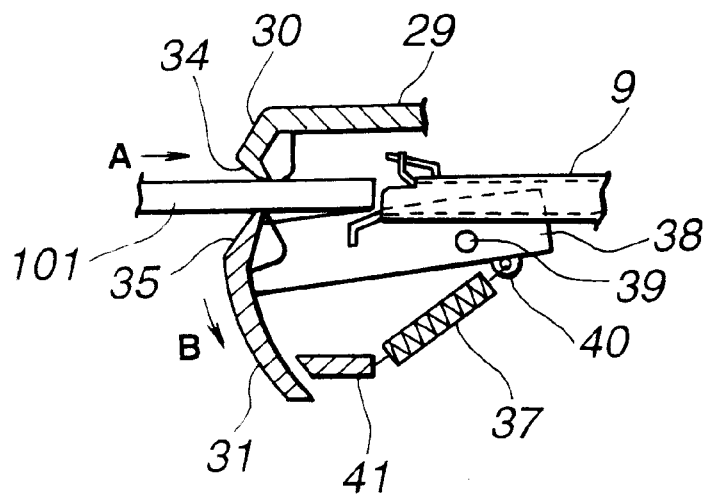
FIG. 7 is a schematic longitudinal cross-sectional view showing a disc cartridge being inserted into the inside of the recording/reproducing apparatus.

When the disc cartridge 101 inserted into the cartridge holder 9 is moved towards the cartridge holder 9 in the direction indicated by arrow A in FIG. 7, the door member 31 has its first inclined surface 35 thrust by the forward edge along the direction of movement of the disc cartridge 101, so as to be rotated against the bias of the tension coil springs 37, as indicated by arrow B in FIG. 7.

The force acting on the door member 31 by the forward edge along the movement direction of the disc cartridge 101 against the first inclined surface 35 is the perpendicular drag along the direction of a normal line drawn to the first inclined surface 35 at a site of abutment between the forward edge along the movement direction of the disc cartridge 101 and the first inclined surface 35. That is, the first inclined surface 35 is set at such an angle of inclination that the normal line to the first inclined surface 35 at the site of abutment between the forward edge along the movement direction of the disc cartridge 101 and the first inclined surface 35 is on the lower side of the pivot 39.

The door member 31 cooperates at its upper edge with the lower edge of the closure member 30 to clamp the upper and lower major surfaces of the disc cartridge 101 to guide the disc cartridge 101 moved towards the cartridge holder 9, as shown in FIG. 7. After the disc cartridge 101 is housed within the cartridge holder 9, the door member 31 is closed under the bias of the tension coil springs 37, as indicated by arrow C in FIG. 8.

When the disc cartridge 101 is inserted in this manner into the cartridge holder 9, a shutter, not shown, is slid by a shutter opening mechanism, not shown, with respect to the cartridge, to open each recording/reproducing aperture. The recording disc, facing the outer side of the cartridge via these recording/reproducing apertures, is inserted into a space between the head arms. That is, the magnetic heads at this time face both the major surfaces of the recording disc.

After the disc cartridge 101 is inserted into the cartridge holder 9 in this manner, the completion of insertion of the disc cartridge 101 is detected by a detection mechanism, not shown, and the motor 22 is run in rotation via a control circuit. As the cam plate 10 is moved forwards, the cartridge holder 9 is moved downwards, that is towards the disc table.

When the cartridge holder 9 is lowered, the cartridge of the disc cartridge, held by this cartridge holder 9, is positioned by having its four corners supported by the distal ends of positioning pins, not shown, set upright on the chassis. When the cartridge is positioned on the chassis, the presence of the cartridge and the possible presence of plural discriminating holes formed in the bottom surface of the cartridge are detected by plural detection switches provided on the electronic circuit substrate 8 in register with the positions of the pre-set positions on the bottom surface of the cartridge and the positions of these discriminating holes.

That is, a disc-in detection switch 18 for detecting the possible presence of the disc cartridge is provided on the electronic circuit substrate 8, as shown in FIG. 3. On the electronic circuit substrate 8, a write protection detection switch 17 is provided in register with the write protection discriminating opening in the cartridge. This write protection discriminating opening is a discriminating opening indicating whether or not the information signals previously recorded on the recording disc can be erased by overwrite recording or erasure.

On the electronic circuit substrate 8, there are also provided disc capacity detection switches 20a, 20b in register with the disc capacity discriminating openings in the cartridge. These disc capacity discriminating openings indicate the recording capacity of the disc cartridge.

At this time, the hub of the recording disc is attracted bu a magnet provided on the disc table 5 so as to be retained on the disc table 5. The spindle shaft 6 is fitted into the center hole of the hub. The chuck pin 7 is abutted against the hub of the recording disc and, on rotation of the disc table 5, is fitted into a chuck opening formed in the hub.

When the recording disc is run in rotation at an elevated speed, the magnetic head faces the major surface of the recording disc with the interposition of an extremely thin air layer produced on the major surface of the recording disc. These magnetic heads are elastically biased towards the major surfaces of the magnetic disc as indicated by arrows H1 and H2 in FIG. 3. When the recording disc is run in rotation at an elevated speed, these magnetic heads are maintained at the position of equilibrium between the pressure of the air layer produced on the major surface of the magnetic disc and the biasing force applied by the head arms 13a, 13b. In this manner, the information signals are recorded or reproduced by the magnetic heads on or from the recording disc.

The door member 31 has, on its side facing the cartridge holder 9, a second inclined surface 43 inclined relative to the direction of movement of the disc cartridge 101 ejected from the cartridge holder 9, on the path of movement of the disc cartridge 101, as shown in FIG. 9. The closure member 30 also includes, on its lower edge facing the cartridge holder 9, an upper side inclined surface 42, inclined relative to the direction of movement of the disc cartridge 101 ejected from the cartridge holder 9. This upper side inclined surface 42 operates for guiding the forward edge along the direction of movement of the disc cartridge onto the second inclined surface 43 of the door member 31 when the disc cartridge is ejected towards the front side of the recording/reproducing apparatus.

Figure 10:
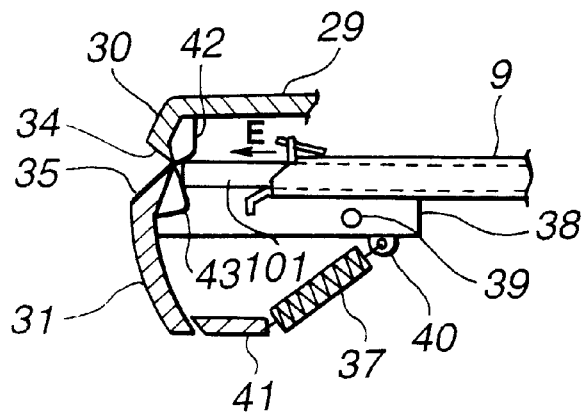
FIG. 10 is a schematic longitudinal cross-sectional view showing a disc cartridge about to be ejected from the recording/reproducing apparatus.

When the disc cartridge 101 is ejected from the cartridge holder 9, the ejection button is actuated to drive the motor 22 by the control circuit, not shown. The cam plate 10 then is moved by the driving force of the motor 22 towards rear as indicated by arrow D in FIG. 9 so that the cartridge holder 9 is uplifted in a direction away from the disc table. When the disc cartridge 101 is ejected from the cartridge holder 9, as shown in FIG. 10, and is moved outwards in the direction indicated by arrow E in FIG. 10, the door member 31 has its second inclined surface 43 thrust by the forward edge along the direction of movement of the disc cartridge of the disc cartridge 101 so that it is rotated against the bias of the tension coil springs 37. The disc cartridge 101 is ejected from the cartridge holder 9 under the driving of the motor or under pre-charged biasing means, such as springs.

The force acting on the door member 31 by the forward edge along the movement direction of the disc cartridge 101 against the second inclined surface 43 is the perpendicular drag along the direction of a normal line drawn to the second inclined surface 43 at a site of abutment between the forward edge along the movement direction of the disc cartridge 101 and the second inclined surface 43. That is, the second inclined surface 43 is set at such an angle of inclination that the normal line to the second inclined surface 43 at the site of abutment between the forward edge along the movement direction of the disc cartridge 101 and the second inclined surface 43 is on the lower side of the pivot 39.

Figure 11:
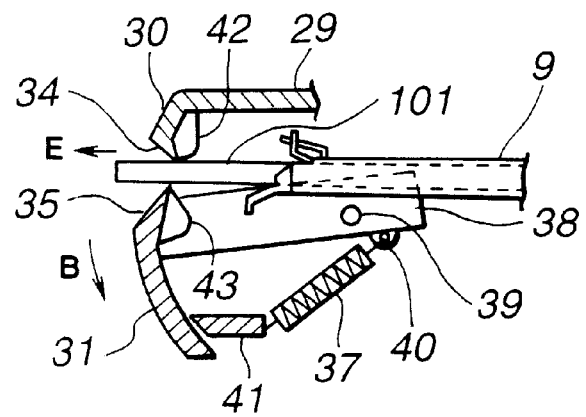
FIG. 11 is a schematic longitudinal cross-sectional view showing a disc cartridge being ejected from the recording/reproducing apparatus.

The door member 31 cooperates at its upper edge with the lower edge of the closure member 30 to clamp the upper and lower major surfaces of the disc cartridge 101 to guide the disc cartridge 101 moved towards the cartridge holder 9, as shown in FIG. 11. Meanwhile, if the disc cartridge 101 has been ejected from the cartridge holder 9, the shutter is slid relative to the cartridge to close each recording/reproducing aperture.

Figure 12:
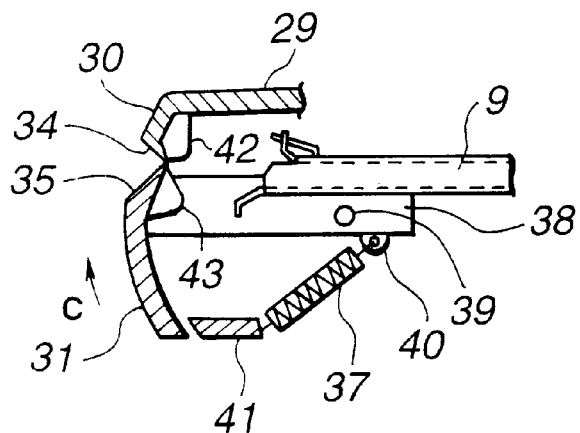
FIG. 12 is a schematic longitudinal cross-sectional view showing a disc cartridge which has just been ejected from the recording/reproducing apparatus.

After the disc cartridge has been ejected towards the front side of the front panel 29, the door member 31 is closed under the bias of the tension coil springs as indicated by arrow C in FIG. 12.

In this recording/reproducing apparatus, the door member 31 may be provided with balance weights 50, as shown in FIG. 4. These balance weights 50 are mounted on the rear ends of left and right rotation supporting arms 38, 38, and the comprehensive center of gravity from the door member 31 to the balance weights 50 is positioned on the axis of the pivot 39 corresponding to the center line of rotation of the door member 31. In this case, the rotating operation of the door member 31 may be achieved smoothly without regard to the direction of rotation.

The tension coil springs, as biasing means, may be mounted only on one side of the door member 31.

The present recording/reproducing apparatus need not be provided with driving power generating means. In this case, the cartridge holder is moved under the bias force of a spring etc to permit the attachment of the recording medium it holds on the recording/reproducing apparatus.

The angles of inclination of the first inclined surface and the second inclined surface for the disc cartridge 101, formed in the door member, and the upper side inclined surface, formed in the front panel, in the above-described recording/reproducing apparatus, are explained with reference to the drawings.

Meanwhile, in the above-described recording/reproducing apparatus, the tension coil spring 37 biasing the door member 31 has its one end attached to the spring retainer 41. In a modification of a recording/reproducing apparatus, shown in FIGS. 15 and 16, the tension coil spring 37 has its one end attached to a spring mounting piece formed in a lower cover 12. In this modification of the recording/reproducing apparatus, the components which are the same as those of the above-described recording/reproducing apparatus are denoted by the same reference numerals without explanation specifically.

Figure 15:
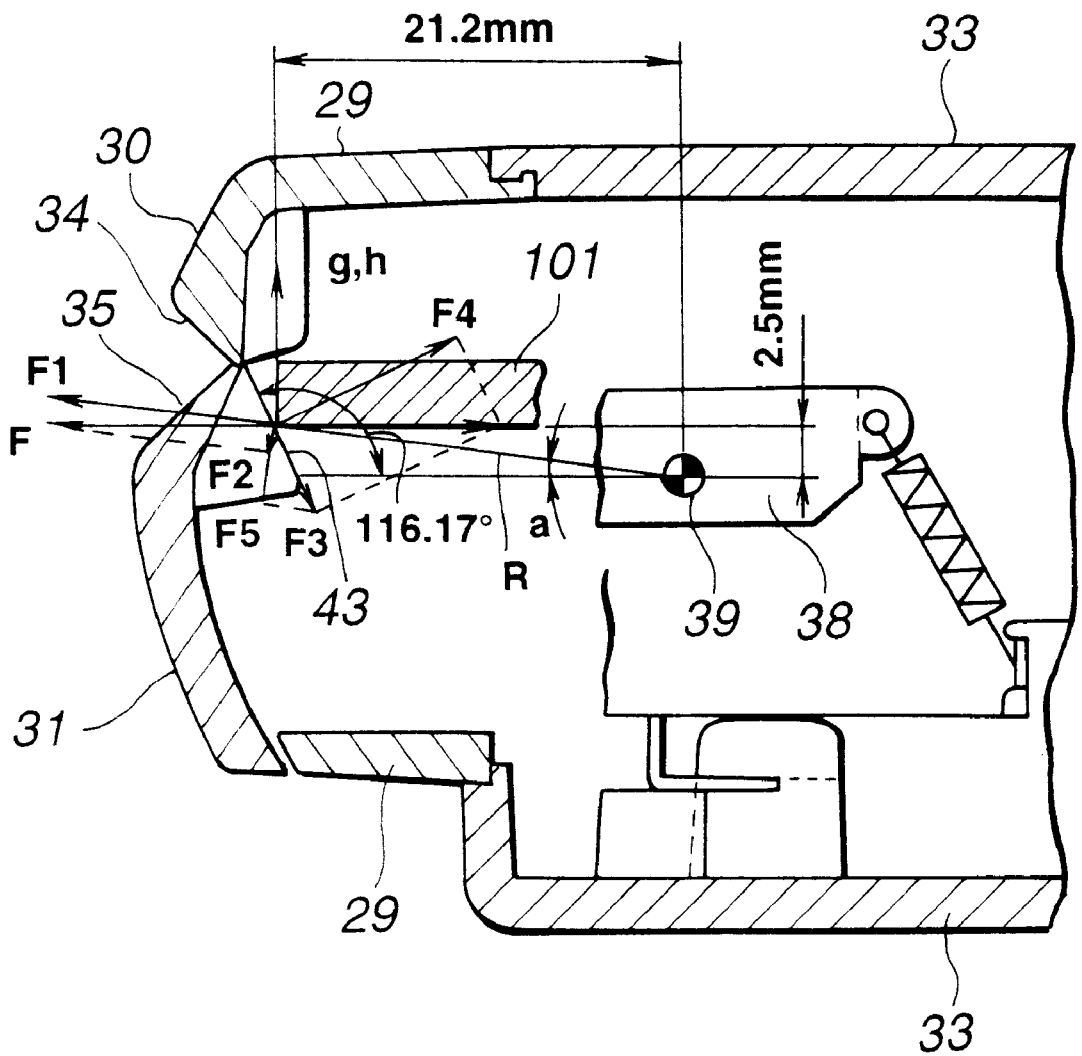
FIG. 15 is a longitudinal cross-sectional view showing a typical dimension of respective parts operating for opening a door at the time of ejection of the disc cartridge.
Figure 16:
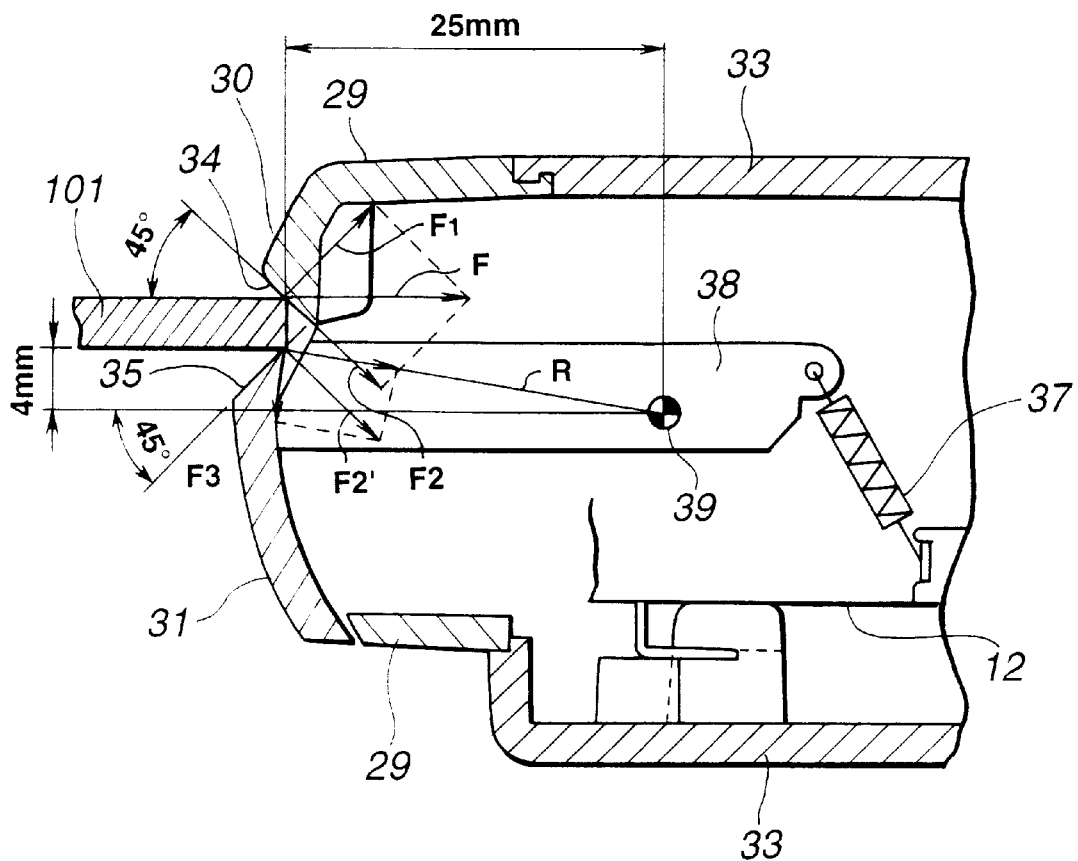
FIG. 16 is a longitudinal cross-sectional view showing a typical dimension of respective parts operating for opening a door at the time of insertion of the disc cartridge.
Figure 17:
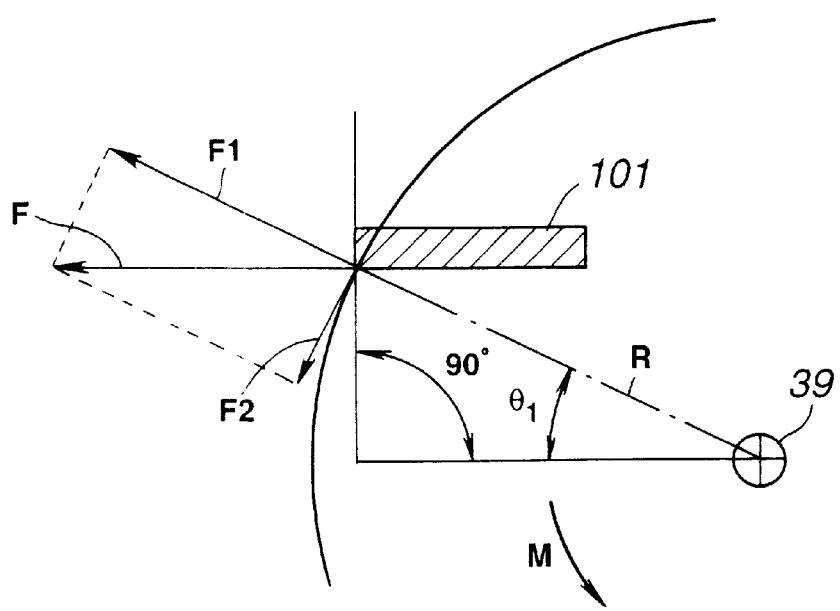
FIG. 17 is a schematic view showing a case in which a second inclined surface of the door is perpendicular to the disc cartridge ejecting direction.

In the present modification, the sizes of the respective components are set to permit reliable opening and closure of the door member 31 with insertion and detachment of the disc cartridge 101, as shown in FIGS. 15 and 16. The size setting of the respective components is now explained.

First, the size setting of a structure for ejecting the disc cartridge 101 is explained by referring to the drawings.

[1] If the second inclined surface 43 of the door member 31, on which abuts the disc cartridge 101 being ejected, is normal to the ejecting direction of the disc cartridge 101, the vector F by the ejecting force acting on the disc cartridge 101, or the force produced by the angle of inclination $\theta 1$ between the ejecting direction and the point of abutment, is resolved into a vector F1 and a vector F2. It is noted that the point of abutment is so termed although it should correctly be termed a line of abutment. Since this vector F2 operates in a direction normal to the turning radius of a turning circle traversing the point of abutment, the moment M causing the rotation of the door member 31 is given by $$F1 = F \times \cos(\theta1)$$

$$F2 = F \times \cos(90 - \theta1) \quad (1)$$

so that $$M = F2 \times R = F \times \cos(90 - \theta1) \times R.$$

Figure 18:
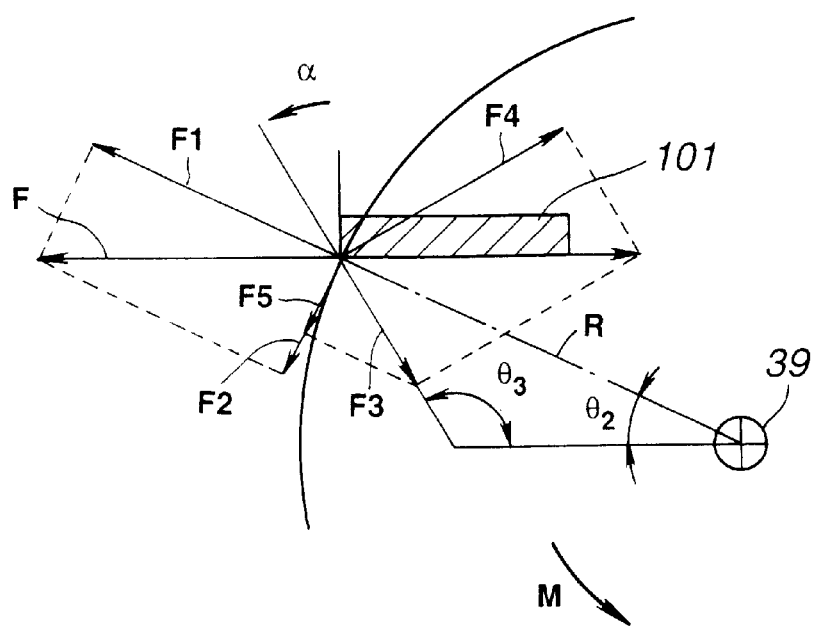
FIG. 18 is a schematic view showing a case in which a second inclined surface of the door is at an angle to the disc cartridge ejecting direction.

[2] It is then assumed that the second inclined surface 43 of the door member 31, on which abuts the disc cartridge 101, is inclined in the direction indicated by arrow a in FIG. 18 relative to the direction of ejection of the disc cartridge 101, that is inclined in the direction indicated by arrow α relative to a normal line to the direction of ejection of the vector F acting on the disc cartridge 101. The normal line is so termed for convenience although it should correctly be termed a normal plane. The force to be added in this case is a vector e F5 obtained on resolving the force of reaction F' generated in the opposite direction to the direction of ejection of the disc cartridge 101 into a reactive force F3 and a reactive force F4 with respect to the inclination of the second inclined surface 43 and extracting the force along the direction of rotation of the door member 31 in the force of reaction F3 produced along the inclination of the second inclined surface. By addition of the vector F5 to the force in the direction of rotation of the door member 31, the rotational moment M of the door member 31 is increased:

$$F3 = F' \times \cos(180 - \theta3)$$

$$F4 = F' \times \cos(\theta2 - 90))$$

$$F5 = (F2 + F5) \times R$$

Using F2 of the above-mentioned equation 1, $$M = (F2 + F5) \times R.$$

[3] If the second inclined surface 43 of the door member 31, on which abuts the disc cartridge 101 being ejected, is inclined in the direction indicated by arrow α in FIG. 18 with respect to the direction of ejecting the disc cartridge 101, that is inclined in the direction indicated by arrow α in FIG. 18 relative to a normal line normal to the direction of ejection corresponding to the vector F acting on the disc cartridge 101 (this normal line is so termed for convenience although it should more correctly be termed a normal plane), the force to be added is a vector F5 which is obtained on resolving the force of reaction F' produced in the reverse direction to the direction of ejection of the disc cartridge 101 into a force of reaction F3 and a force of reaction F4 taking into account the inclination of the second inclined surface 43, and on extracting the force in the direction of rotation of the door member 31 in the force of reaction F3 generated along the inclination of the second inclined surface. By addition of the vector F5 to the force of rotation of the door member 31, the rotational moment M of the door member 31 is increased:

$$F3 = F' \times \cos(180 - \theta3)$$

$$F4 = F' \times \cos(\theta2 - 90))$$

$$F5 = (F2 + F5) \times R.$$

Using F2 in the above-described equation F1, $$M = (F2 + F5) \times R.$$

Figure 19:
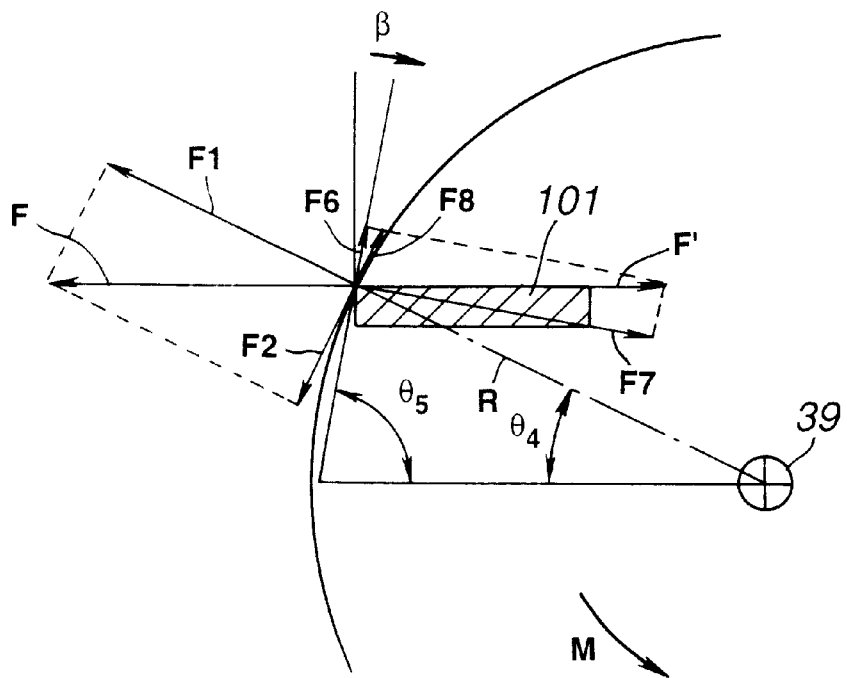
FIG. 19 is a schematic view showing another case in which a second inclined surface of the door is at an angle to the disc cartridge ejecting direction.

[3] If the second inclined surface 43 of the door member 31, on which abuts the disc cartridge 101, is inclined in the direction indicated by arrow β in FIG. 19 with respect to the direction of ejecting the disc cartridge 101, the force of reaction produced due to the inclination of the second inclined surface 43, from the vector F2 rotating the door member 31 discussed in [1], is produced in the reverse direction. Thus, the moment of rotation M of the door member is decreased due to the decreased vector. The force which decreases the force of rotation of the door member 31 is a vector F8 corresponding to a component force of a force of reaction F6 generated in the reverse direction to the direction of opening the door member 31. This force of reaction F6 is generated along the second inclined surface 43 as a result of resolution of the force of reaction F' operating in the opposite direction of the force of ejection of the disc cartridge 101 into the force of reaction F6 along the second inclined surface 43 and another force of reaction F7:

$$F6 = F' \times \cos(\theta5)$$

$$F7 = F' \times \cos(90 - \theta5)$$

$$F8 = F3 \times \cos(\theta4 + \theta5 - 90).$$

Using F2 of the above-mentioned equation F1, $$M = (F2 - F8) \times R.$$

Figure 20:
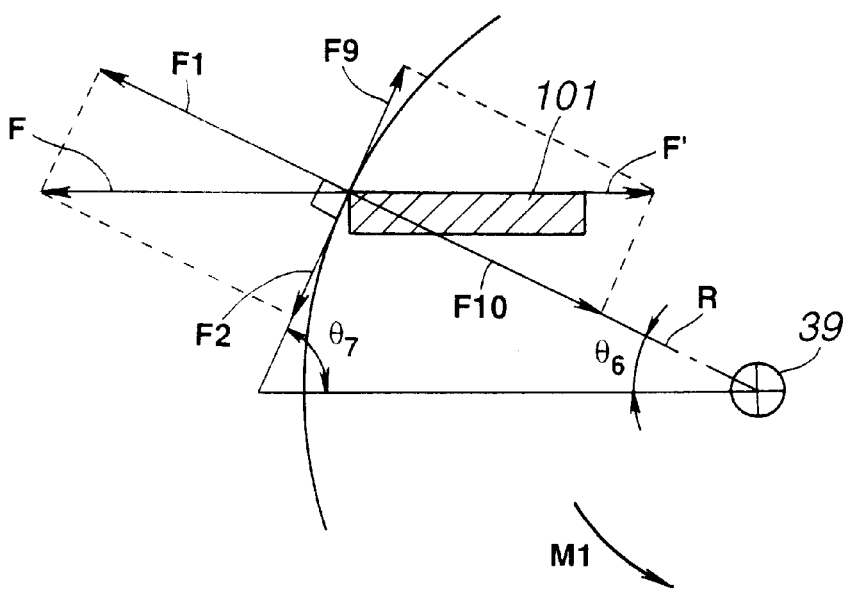
FIG. 20 is a schematic view showing a case in which a second inclined surface of the door is at an angle to the disc cartridge ejecting direction and is in the same direction as a tangential line to a turning circle traversing a point of abutment on the disc cartridge.

[4] If the second inclined surface 43 of the door member 31, on which abuts the disc cartridge 101, is inclined in the direction indicated by arrow β in FIG. 20 with respect to the direction of ejecting the disc cartridge 101, and is in the same direction as a tangential line of a turning circle traversing the point of abutment between the disc cartridge 101 and the door member 31, the vector F2 which causes rotation of the door member 31 discussed in [1] and the force of reaction generated due to the inclination of the second inclined surface relative to the tangential line act for cancelling the vector which causes rotation of the door member 31, so that there is produced no rotational moment M.

As for this vector cancelling force, the force of reaction F' produced in the reverse direction of the force of ejecting the disc cartridge 101 is resolved into a force of reaction F9 and another force of reaction F10, taking the inclination into account, as shown in FIG. 20. The force of reaction F9, generated along the second inclined surface 43, is generated in the opposite direction to the vector F2 operating in the rotating direction of the door member 31, so that the force of reaction F9 and the vector F2 cancel each other to annul the force of rotation of the door member 31.

Referring to FIG. 20, $$F9 = F' \times \cos(\theta7)$$

$$F10 = F' \times \cos(90 - \theta7).$$

Using F2 of the equation 1, $$F2 = F9$$

$$M = (0) \times R = 0.$$

Figure 21:
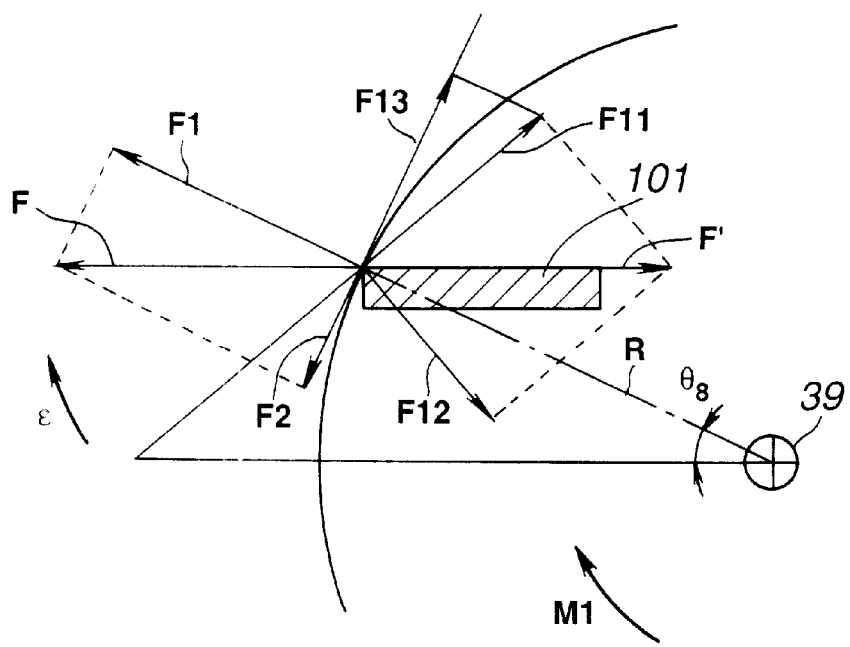
FIG. 21 is a schematic view showing a case in which a second inclined surface of the door is at an angle a tangential line to a turning circle traversing a point of abutment on the disc cartridge.
Figure 22:
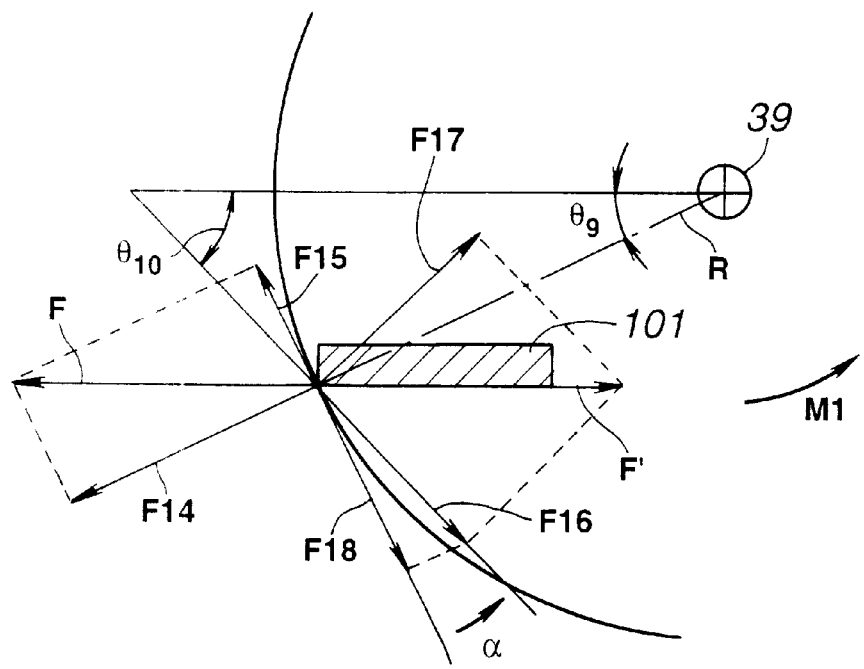
FIG. 22 is a schematic view showing a case in which a second inclined surface of the door is below the pivot and is at an angle.

[5] If the second inclined surface 43 of the door member 31, on which abuts the disc cartridge 101, is inclined in the direction indicated by arrow ε in FIG. 21 with respect to a tangential line of a turning circle traversing the point of abutment between the disc cartridge 10 and the door member 31, the force of reaction F' produced in the opposite direction to the force of ejection of the disc cartridge 101 is resolved into a force of reaction F11 and another force of reaction F12, taking the inclination into account, as shown in FIG. 21. In this case, the force of reaction produced along the second inclined surface 43 becomes larger than the vector operating in the direction of opening the door member 31 thus causing the rotation of the door member 31 in the closing direction.

[6] If the point of ejection of the disc cartridge 101 is below the pivot 39 of the door member 31, and the second inclined surface 43 of the door member 31 is inclined, the force of ejection F of the disc cartridge 101, that is the force generated by the radius of rotation R of the door member 31 traversing the point of abutment of the disc cartridge 101 and the angle of inclination θ9 between the radius of rotation R and the ejecting direction R, is resolved into the vector F14 and the vector F15. Since this vector F15 acts in a direction perpendicular to the radius of rotation R of the door member 31, there is produced a vector acting in the reverse direction to the opening direction of the door member 31:

$$F14 = F \times \cos(\theta 9)$$

$$F15 = F \times \cos(90 - \theta 9).$$

If the second inclined surface is inclined in the direction indicated by arrow α with respect to the tangential line draw to a turning circle of the door member 31, the force of reaction generated in the second inclined surface is larger than the vector F which causes rotation of the door member 31 in the closure direction, the door member 31 is turned in the opening direction.

As for the force of reaction which causes rotation of the door member 31 in the opening direction, the force of reaction F' generated by the force of ejection of the disc cartridge 101 is resolved into the force of reaction F16 along the direction of inclination of the second inclined surface, and the force of reaction F17. Since the force of reaction F16 generated along the direction of inclination of the second inclined surface is generated in the direction of opening the door member 31, and the vector F18 extracted from this force of reaction F16 is larger than the rotational vector F15 of the door member 31, the latter is turned in the opening direction:

$$F16 = F' \times \cos(\theta 10)$$

$$F17 = F' \times \cos(90 - \theta 10)$$

$$F18 = F16 \times \cos(\theta 9 + \theta 10 + 90)$$

$$F2 < F9$$

$$M = (F9 - F2) \times R.$$

Therefore, it is presupposed that the second inclined surface of the door member 31 is inclined in the direction indicated by arrow α in FIG. 18 with respect to the tangential line to a turning circle of the door member 31 traversing the point of abutment of the disc cartridge 101 ejected from the cartridge holder 9 with the door member 31. This condition holds for a case when the point of ejection of the disc cartridge 101 is on the lower side of the pivot 39 of the door member 31.

That is, the second inclined surface of the door member 31 is inclined in the ejecting direction relative to the plane parallel to the end face on the discharging side of the disc cartridge 101 ejected from the cartridge holder.

In actuality, for opening/closing the door member 31, the self-weight of the door member 31, the force of holding the door member 31 in the closed state, and the loss due to dynamic friction on rotation of the door member 31, need to be taken into account.

That is, the self-weight of the door member 31 acts as a biasing force biasing the door member 31 in its closing direction in a state in which the longitudinal direction of the door member 31 is horizontal. However, if the recording/reproducing apparatus is placed in a vertical position and the longitudinal direction of the door member 31 is in a plumb-line position, the self-weight of the door member 31 cannot operate as a biasing force biasing the door member 31 in its closing direction. Therefore, a biasing force needs to be provided for biasing the door member 31 in its closing direction.

The holding force for holding the door member 31 needs to be set to a magnitude on the order of five times its self-weight in order to assure a closed state against inadvertent opening due to vibrations of application of an external force to the recording/reproducing apparatus. As for the loss due to friction of rotation, it is necessary to take into account the force of dynamic friction generated in each supporting part adapted for rotatably supporting the door member 31.

The respective parts of the door member 31 are set to sizes shown for example in FIG. 15. Using the sizes indicated in FIG. 15, the moment of rotation M of the door member 31 is calculated.

If the force of rejection operating on the disc cartridge 101 when ejecting the disc cartridge from the cartridge holder 9 is 1000 gf, the angle with which the disc cartridge 101 compresses against the door member 31 is $\tan^{-1}(2.5/21.2) = 6.73°$;

the angle of inclination of the second inclined surface of the door member 31 on which abuts the disc cartridge 101 at the time of ejection is 116.17°, the turning circle of the abutted door member 31 is $$\sqrt{\sqrt{2.5 \times 2.5 + 21.2 \times 21.2}} = 21.33 \text{ mm}$$

$$F1 = 100 \times \cos(6.73°) = 99.31$$

$$F2 = 100 \times \cos(90° - 6.73°) = 11.72$$

$$F3 = 100 \times \cos(180° - 116.17°) = 44.10$$

$$F4 = 100 \times \cos(116.17° - 90°) = 37.03$$

$$F5 = 44.10 \times \cos(6.73° + 116.17° - 90°) = 37.03$$

$$M = (11.72 + 37.03) \times 21.33 = 1039 \text{ gf} \cdot \text{mm}.$$

If the self-weight of the door member 31 is 5 gf, the holding power of the door member 31 is 5 gf×5G=25 gf and the dynamic frictional coefficient is 0.2, the moment of rotation M1 necessary for opening the door member 31 is $$M1 = \{(5 \times 25) + (5 \times 25) \times 0.2\} \times 21.33 = 767.88 \text{ gf} \cdot \text{mm}.$$

Therefore, M>M1, such that the disc cartridge 101 is ejected as it opens the door member 31 by the force of ejection.

Referring to the drawings, the size setting of various configurations for inserting the disc cartridge 101 is now explained.

[7] It is assumed that the door member 31 is not opened such that the disc substrate 101 cannot be inserted.

(7-1) If, in this case, the first inclined surface 35 of the door member 31 and the upper inclined surface 34 of the front panel 29 are perpendicular to the inserting direction of the disc cartridge 101, the force of insertion F of the disc cartridge 101 operates on the door member 31 and on the front panel 29. However, since the front panel 29 is of a rigid material, there is applied no force to the door member 31 such that the disc cartridge cannot be inserted in position.

(7-2) If the upper inclined surface 34 of the front panel 29 is perpendicular to the inserting direction of the disc cartridge 101 and the first inclined surface 35 of the door member 31 is inclined relative to the relative to the inserting direction of the disc cartridge 101, the force of insertion F of the disc cartridge 101 acts on the first inclined surface 35 of the door member 31 such that the force of insertion F of the disc cartridge 101 is resolved into a vector F5 and a vector F6. The inserting direction of the disc cartridge 101 is changed by the vector F6 generated along the first inclined surface 35. Thus, the disc cartridge 101 compresses against the front panel 29 as it is moved along the first inclined surface 35. However, the disc cartridge 101 cannot be inserted because the front panel 29 is of a rigid material.

(7-3) If the first inclined surface 35 of the door member 31 is inclined in the direction indicated by arrow α in FIG. 25 relative to a tangential line of a turning circle of a radius of rotation R of the door member 31 traversing the point of abutment between the disc cartridge 101 and the door member 31, the first inclined surface 35 of the door member 31 is turned in the inserting direction of the disc cartridge 101, that is in the opening direction of the door member 31, as shown in FIGS. 25a and 25b. Thus, the first inclined surface 35 of the door member 31 operates for thrusting back the disc cartridge 101 to render the insertion of the disc cartridge 101 impossible.

[8] It is then assumed that the door member 31 has been opened to permit insertion of the disc cartridge 101.

Figure 26A:
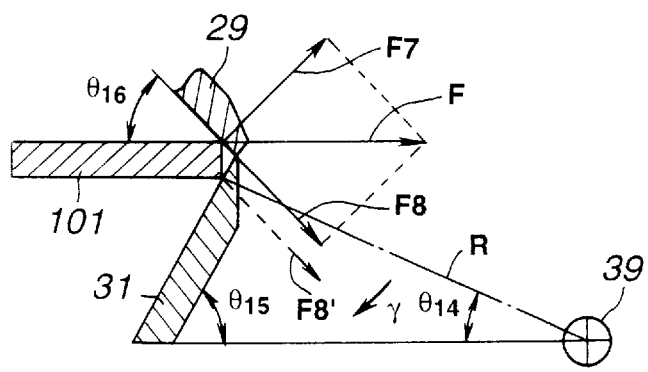
FIGS. 26a and 26b are schematic views showing a case in which the door is operated for opening to permit insertion of a disc cartridge.
Figure 26B:
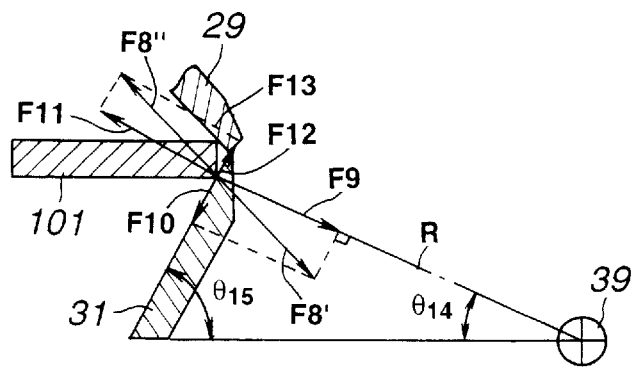

(8-1) The force of insertion F of the disc cartridge 101, acting on the upper inclined surface 34 of the front panel 29, as shown in FIGS. 26a and 26b, is resolved into a vector F7 and a vector F8. The inserting direction of the disc cartridge 101 is changed by the vector F8 generated along the upper inclined surface 34 and is transferred to the vector F8' of thrusting the door member 31 inwards. If this vector F8' is positioned in the direction indicated by arrow γ in FIG. 26 with respect to the turning radius R of the turning circle traversing the point of abutment between the disc cartridge 101 and the door member 31, the vector F8' is resolved into vectors F9 and F10, by the turning radius R an the angle of inclination θ14 relative to the inserting direction of the turning radius R, as shown in FIGS. 26a and 26b. The vector F10 acts in the direction perpendicular to the turning radius R of the door member 31. Since the force of reaction is generated in the opposite direction because of the inclination of the first inclined surface 35 of the door member 31, the moment of rotation M of the door member 31 by the vector F10 is decreased. Referring to FIGS. 26a and 26b, $$F7 = F \times \cos(\theta 16)$$

$$F8 = F \times \cos(90 - \theta 16)$$

$$F8 = F8'$$

$$F9 = F8 \times \cos(\theta 16 - \theta 14)$$

$$F10 = F8 \times \cos(90 - \theta 16 + \theta 14)$$

$$F8'' = F8$$

$$F11 = F8 \times \cos(180 - \theta 16 - \theta 15)$$

$$F12 = F8 \times \cos(\theta 16 + \theta 15 - 90)$$

$$F13 = F12 \times \cos(90 - \theta 14 - \theta 15)$$

and therefore $$M = (F10 - F13) \times R$$

so that the door member 31 is opened.

Figure 27A:
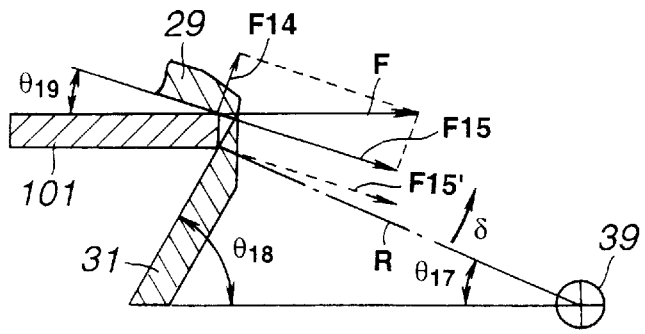
FIGS. 27a and 27b are schematic view showing another case in which the door is operated for opening to permit insertion of a disc cartridge.
Figure 27B:
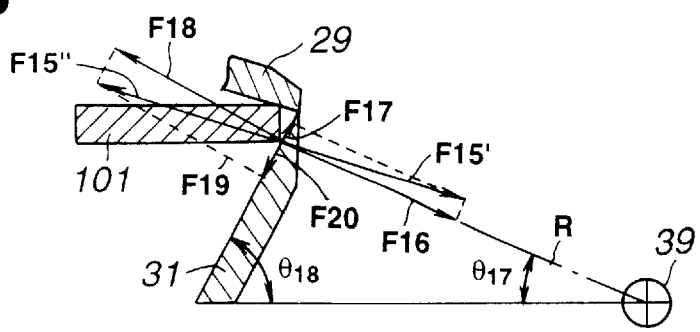

(8-2) If the inserting force F of the disc cartridge 101 acts on the upper inclined surface 34 of the front panel 29, the inserting force is resolved into vectors F14 and F15, as shown in FIGS. 27a and 27b. The inserting direction of the disc cartridge 101 is changed by the vector F15 generated along the upper inclined surface 34 and is transferred to the vector F15' of thrusting the door member 31 inwards. If this vector F15' is positioned in the direction indicated by arrow γ in FIG. 27 with respect to the turning radius R of the turning circle traversing the point of abutment between the disc cartridge 101 and the door member 31, the vector F15' is resolved into vectors F16 and F17, by the turning radius R an the angle of inclination θ14 relative to the inserting direction of the turning radius R, as shown in FIGS. 26a and 26b. The vector F10 acts in the direction perpendicular to the turning radius R of the door member 31. The force of reaction F19, generated by the inclination of the first inclined surface 35 of the door member 31, is produced in the direction of opening the door member 31 such that the vector F20 as a component opening the door member 31 generates the moment of rotation M. Referring to FIGS. 27a and 27b, $$F14 = F \times \cos(\theta 19)$$

$$F15 = F \times \cos(90 - \theta 19)$$

$$F15 = F15'$$

$$F16 = F15 \times \cos(\theta 19 - \theta 17)$$

$$F17 = F15 \times \cos(90 - \theta 19 + \theta 17)$$

$$F15'' = F15$$

$$F18 = F15 \times \cos(\theta 19 + \theta 18)$$

$$F19 = F15 \times \cos(\theta 19 + \theta 18)$$

$$F20 = F19 \times \cos(90 - \theta 17 - \theta 18)$$

and therefore $$M = (F19 - F17) \times R$$

thus the door member 31 is opened.

[9] It is then assumed that the vector generated by abutment of the disc cartridge 101 on the upper inclined surface 34 of the front panel 29 is of the same angle as the tangential line of a turning radius traversing the point of abutment between the disc cartridge 101 an the door member 31.

Figure 28A:
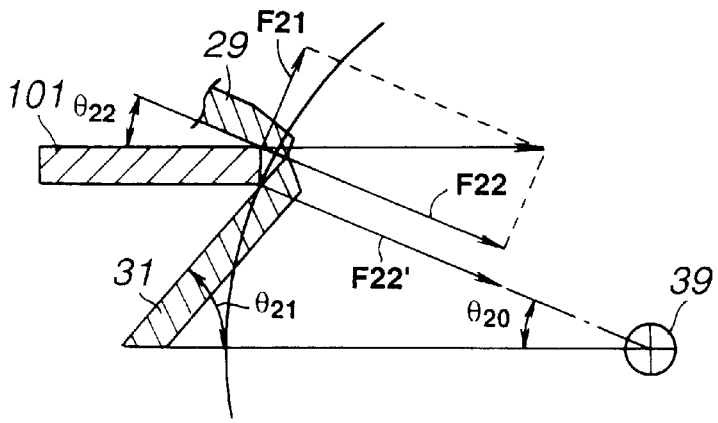
FIGS. 28a and 28b are schematic views showing a case in which a vector produced on abutment of the disc cartridge against a front panel is at the same angle as a tangential line of a turning circle traversing the point of abutment between the disc cartridge and the door.
Figure 28B:
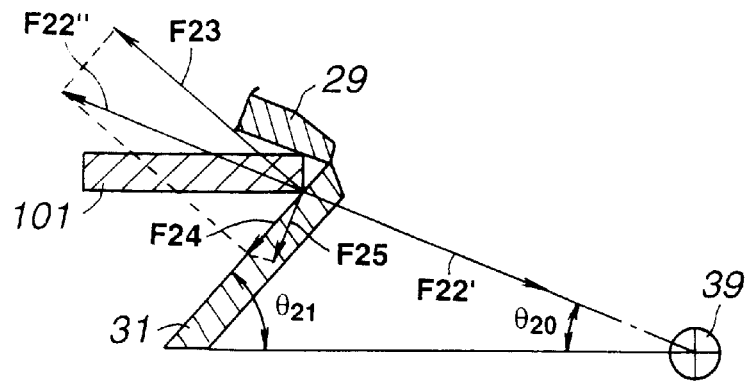

(9-1) Referring to FIGS. 28a and 28b, the force of insertion F of the disc cartridge 101 abutting on the upper inclined surface 34 of the front panel 29 is resolved into vectors F21 and F22. The inserting direction of the disc cartridge 101 is changed by the vector F22 generated along the upper inclined surface 34 and is transferred to the vector F22'. Since this vector F22' is of the same direction as the turning radius traversing the point of abutment between the disc cartridge 101 and the door member 31, there is produced no force of rotating the door member 31. However, the force of reaction F25, produced by the inclination of the first inclined surface 35 of the door member 31, is produced along the direction of rotation of the door member 31. Thus, the vector F25, as a component of the force opening the door member 31, produces the moment of rotation M:

$$F21 = F \times \cos(\theta 22)$$

$$F22 = F \times \cos(90 - \theta 22)$$

Since the vector F22' is in the same direction as the turning radius R traversing the point of abutment between the disc cartridge 101 and the door member 31, it produces no force:

$$F22 = F22'$$

$$F23 = F22 \times \cos(90 - \theta 22 - \theta 21)$$

$$F24 = F22 \times \cos(\theta 22 + \theta 21)$$

$$F25 = F24 \times \cos(90 - \theta 20 - \theta 21)$$

and hence $$M = F25 \times R$$

such that the door member 31 performed its opening movement.

Figure 29:
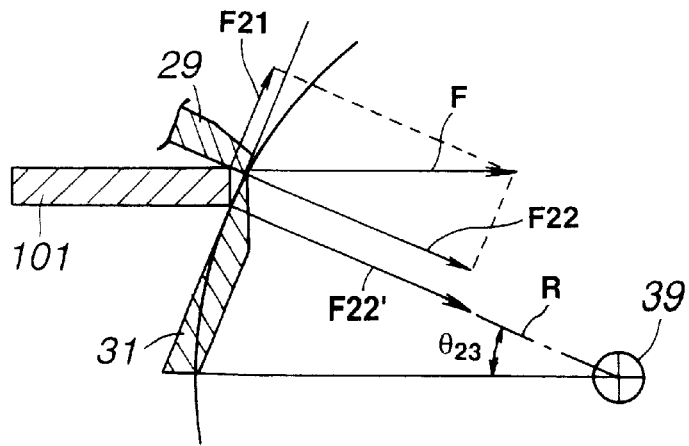
FIG. 29 is a schematic view showing a case in which the first inclined surface of the door is at the same angle as a tangential line to a turning circle traversing a point of abutment between the disc cartridge and the door.

(9-2) Referring to FIG. 29, the force of insertion F of the disc cartridge 101, abutting on the upper inclined surface 34 of the front panel 29, is resolved into vectors F21 and F22. The inserting direction of the disc cartridge 101 is changed by the vector F22 generated along the upper inclined surface 34 and is transferred to the vector F22'. Since this vector F22' is of the same direction as the turning radius traversing the point of abutment between the disc cartridge 101 and the door member 31, there is produced no force of rotating the door member 31. If the angle of inclination of the first inclined surface 35 of the door member 31 is of the same angle as a tangential line of a turning circle traversing the point of abutment between the disc cartridge 101 and the door member 31, as shown in FIG. 29, the forces of reaction cancel each other, so that no force rotating the door member 31 is produced.

In actuality, for opening/closing the door member 31, the self-weight of the door member 31, the force of holding the door member 31 in the closed state, and the loss due to dynamic friction on rotation of the door member 31, need to be taken into account.

In consideration of the above-mentioned forces, the sizes of various portions of the door member 31 are set, as shown for example in FIG. 16. Using the sizes, shown in FIG. 16, the moment of rotation M of the door member 31 are calculated.

If the force of insertion required for opening the door member 31 to inset the disc cartridge 101 is 1000 gf, the angle of abutment of the disc cartridge 101 with the door member is 45°, the angle of inclination of the abutment surface of the door member 31 by the disc cartridge 101 at the time of insertion is 45°, the turning circle of the door member 31 on which abuts the disc cartridge 101 is $$\sqrt{(4 \times 4 + 25 \times 25)} = 25.32 \text{ mm}$$

The angle of abutment of the pivot 39 of the door member 31 on the disc cartridge 101 is $\tan^{-1}(4/25) = 9.09°$. Thus, using the above values, $$F1 = 1000 \times \cos(45°) = 707,$$

$$F2 = 1000 \times \cos(45°) = 707,$$

$$F2 = F2'$$

$$F3 = 707 \times \cos(90° - 46° + 9.09°) = 414.$$

Therefore, the moment of rotation $M = 414 \times 25.32 = 10482.48$ gf·mm ≈ 1.048 kgf·cm.

If the self-weight of the door member 31 is 5 gf, the holding force of the door member 31 is 5 gf×5G=25 gf, and the dynamic frictional coefficient is 0.2, the moment of rotation M1 required for opening the door member 31 is $M1 = \{(5 \times 25) + (5 \times 25) \times 0.2\} \times 21.33 = 767.88$ gf·mm. Therefore, M>M1, such that the door member 31 is opened by the force of insertion to permit the disc cartridge 110 to be inserted into the cartridge holder 9.

Although the recording/reproducing apparatus according to the present invention is applied to a disc cartridge having a magnetic disc as an information recording medium, it can, of course, be applied to any other suitable recording medium cartridge, such as a tape cartridge having a tape reel carrying a magnetic tape or a memory cartridge carrying an information storage circuit.

What is claimed is:

1. A recording/reproducing apparatus comprising:
   a cartridge holder into which is inserted a recording medium cartridge in a direction extending along the major surface of the recording medium cartridge, said cartridge holder being mounted for movement between a position enabling attachment and detachment of said recording medium cartridge and a loading position which allows for movement of said recording medium cartridge;
   a door member positioned in its initial state on a path of movement of the recording medium cartridge, said door member presenting an inclined surface inclined relative to the direction of movement of said recording medium cartridge on said path of movement, said door member being supported for rotation to a position outside the path of movement of said recording medium cartridge;
   a closure member on an end edge of which is abutted one end edge of said door member when said door member is at an initial position; and
   biasing means for rotationally biasing said door member towards said closure member to set said door member to said initial state;
   wherein when the recording medium cartridge is being inserted into the cartridge holder, said door member is moved towards said cartridge holder by having said inclined surface thrust by a forward edge of the recording medium cartridge in the movement direction of said recording medium cartridge when being inserted so that the door member is rotated against the bias of said biasing means, said door member cooperating at the end edge thereof with the end edge of said closure member to clamp both major surfaces of the recording medium cartridge to guide the recording medium cartridge towards the cartridge holder;

wherein said door member has a second inclined surface thrust by an edge of said recording medium cartridge in the direction of movement of said recording medium cartridge when being ejected, so that the door member is rotated against the bias of the biasing means, said door member cooperating at the end edge thereof with the end edge of said closure member to clamp both major surfaces of the recording medium cartridge to guide the recording medium cartridge when being ejected;

wherein a balance weight is mounted on said door member; and wherein the combined center of gravity of the door member and the balance weight is on a centerline of rotation of said door member.

2. A recording/reproducing apparatus comprising:

a cartridge holder into which is inserted a recording medium cartridge in a direction extending along the major surface of the recording medium cartridge, said cartridge holder being mounted for movement between a position enabling attachment and detachment of said recording medium cartridge and a loading position which allows for movement of said recording medium cartridge;

a door member positioned in its initial state on a path of movement of the recording medium cartridge, said door member presenting an inclined surface inclined relative to the direction of movement of said recording medium cartridge on said path of movement, said door member being supported for rotation to a position outside the path of movement of said recording medium cartridge;

a closure member on an end edge of which is abutted one end edge of said door member when said door member is at an initial position; and biasing means for rotationally biasing said door member towards said closure member to set said door member to said initial state;

wherein when the recording medium cartridge is being inserted into the cartridge holder, said door member is moved towards said cartridge holder by having said inclined surface thrust by a forward edge of the recording medium cartridge in the movement direction of said recording medium cartridge when being inserted so that the door member is rotated against the bias of said biasing means, said door member cooperating at the end edge thereof with the end edge of said closure member to clamp both major surfaces of the recording medium cartridge to guide the recording medium cartridge towards the cartridge holder; and wherein said door member has a second inclined surface thrust by an edge of said recording medium cartridge in the direction of movement of said recording medium cartridge when being ejected, so that the door member is rotated against the bias of the biasing means, said door member cooperation at the end edge thereof with the end edge of said closure member to clamp both major surface of the recording medium cartridge to guide the recording medium cartridge when being ejected;

wherein a third inclined surface abutted by the recording medium cartridge being inserted is formed on said closure member;

wherein said third inclined surface of said closure member and the inclined surface of the door member are inclined in a direction facing each other; the inclined surface of said door member being inclined for facing the major surface of said recording medium cartridge; and wherein the inclined surface of said door member is formed so that a vector component of the force of insertion of the recording medium cartridge parallel to said third inclined surface is disposed below a plane containing a position of abutment of the recording medium cartridge on the inclined surface of the door member and the center of rotation of the door member.

3. The recording/reproducing apparatus according to claim 2, wherein said biasing means includes a pair of tension coil springs mounted on both lateral sides of said door member.

4. The recording/reproducing apparatus according to claim 2, further comprising:

driving force generating means;

said cartridge holder being moved under a driving force generated by said driving force generating means to load the recording medium cartridge it holds on the recording/reproducing apparatus.

5. The recording/reproducing apparatus according to claim 2, wherein the second inclined surface of said door member is inclined in the ejecting direction with respect to a surface parallel to an end face on the ejecting side of the recording medium cartridge ejected from said cartridge holder.

6. A recording/reproducing apparatus comprising:

a cartridge holder into which is inserted a recording medium cartridge in a direction extending along the major surface of the recording medium cartridge, said cartridge holder being mounted for movement between a position enabling attachment and detachment of said recording medium cartridge and a loading position which allows for movement of said recording medium cartridge;

a door member positioned in its initial state on a path of movement of the recording medium cartridge, said door member presenting an inclined surface inclined relative to the direction of movement of said recording medium cartridge on said path of movement, said door member being supported for rotation to a position outside the path of movement of said recording medium cartridge;

a closure member on an end edge of which is abutted one end edge of said door member when said door member is at an initial position; and biasing means for rotationally biasing said door member towards said closure member to set said door member to said initial state;

wherein when the recording medium cartridge is being inserted into the cartridge holder, said door member is moved towards said cartridge holder by having said inclined surface thrust by a forward edge of the recording medium cartridge in the movement direction of said recording medium cartridge when being inserted so that the door member is rotated against the bias of said biasing means, said door member cooperating at the end edge thereof with the end edge of said closure member to clamp both major surfaces of the recording medium cartridge to guide the recording medium cartridge towards the cartridge holder; and wherein said door member has a second inclined surface thrust by an edge of said recording medium cartridge in the direction of movement of said medium cartridge when being ejected, so that the door member is rotated against the bias of the biasing means, said door member cooperating at the end edge thereof with the end edge of said closure member to clamp both major surfaces of the recording medium cartridge to guide the recording medium cartridge when being ejected;

wherein a third inclined surface abutted by the recording medium cartridge being inserted is formed on said closure member;

wherein said third inclined surfaced of said closure member and the inclined surface of the door member are inclined in a direction facing each other; the inclined surface of said door member being inclined for facing the major surface of said recording medium cartridge; and wherein the inclined surface of said door member is formed so that a vector component of the force of insertion of the recording medium cartridge parallel to said third inclined surface is disposed parallel to a plane containing a position of abutment of the recording medium cartridge on the inclined surface of the door member and the center of rotation of the door member.

7. The recording/reproducing apparatus according to claim 6, wherein:

said biasing means includes a pair of tension coil springs mounted on both lateral sides of said door member.

8. The recording/reproducing apparatus according to claim 6, further comprising:

driving force generating means;

wherein said cartridge holder is moved under a driving force generated by said driving force generating means to load the recording medium cartridge it holds on the recording/reproducing apparatus.

9. The recording/reproducing apparatus according to claim 6, wherein:

the second inclined surface of said door member is inclined in the ejecting direction with respect to a surface parallel to an end face on the ejecting side of the recording medium cartridge ejected from said cartridge holder.

* * * * *

UNITED STATES PATENT AND TRADEMARK OFFICE
CERTIFICATE OF CORRECTION

PATENT NO. : 6,392,839 B2
DATED : May 21, 2002
INVENTOR(S) : Keiji Jitsukawa

It is certified that error appears in the above-identified patent and that said Letters Patent is hereby corrected as shown below:

Title page,
Item [54], Title, change "DOOR" to -- DATA --.

Column 3,
Line 3, insert -- use of -- between "provide" and "the".

Column 4,
Line 29, change "view" to -- views --.

Column 5,
Line 65, change "poxinal" to -- proximal --.

Column 9,
Line 8, change "bu" to -- by --.

Column 10,
Line 29, change "etc" to -- , etc., --.

Column 11,
Line 13, change "a" to -- --.
Line 19, change "vectore" to -- vector --.
Lines 33 and 65, change "2-90))" to -- (2-90) --.

Column 15,
Line 53, change "an" to -- and --.

Column 16,
Line 29, change "an" to -- and --.
Line 65, change "an" to -- and --.

Column 17,
Line 65, change "inset" to -- insert --.

Column 19,
Line 63, change "cooperation" to -- cooperating --.
Line 65, change "surface" to -- surfaces --.

UNITED STATES PATENT AND TRADEMARK OFFICE
CERTIFICATE OF CORRECTION

PATENT NO. : 6,392,839 B2
DATED : May 21, 2002
INVENTOR(S) : Keiji Jitsukawa

It is certified that error appears in the above-identified patent and that said Letters Patent is hereby corrected as shown below:

Column 21,
Line 5, insert -- recording -- between "said" and "medium".
Line 16, change "surfaced" to -- surface --.

Signed and Sealed this

Nineteenth Day of November, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,392,839 B2
DATED : May 21, 2002
INVENTOR(S) : Keiji Jitsukawa

It is certified that error appears in the above-identified patent and that said Letters Patent is hereby corrected as shown below:

Column 5,
Line 65, change "proxinal" to -- proximal --.

Column 11,
Line 13, change "a" to -- α --.

Signed and Sealed this

Thirteenth Day of May, 2003

JAMES E. ROGAN
*Director of the United States Patent and Trademark Office*